US011693222B2

(12) United States Patent
Sugiura et al.

(10) Patent No.: US 11,693,222 B2
(45) Date of Patent: Jul. 4, 2023

(54) REFLECTIVE OPTICAL ELEMENT AND STEREO CAMERA DEVICE

(71) Applicant: CANON KABUSHIKI KAISHA, Tokyo (JP)

(72) Inventors: Yoshinori Sugiura, Yokohama (JP); Katsumoto Hosokawa, Tokyo (JP); Hiroyuki Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 16/787,246

(22) Filed: Feb. 11, 2020

(65) Prior Publication Data

US 2020/0183135 A1    Jun. 11, 2020

Related U.S. Application Data

(63) Continuation of application No. PCT/JP2018/030949, filed on Aug. 22, 2018.

(30) Foreign Application Priority Data

| Aug. 24, 2017 | (JP) | 2017-161366 |
| Apr. 3, 2018 | (JP) | 2018-071407 |
| Apr. 3, 2018 | (JP) | 2018-071408 |
| Aug. 20, 2018 | (JP) | 2018-153927 |

(51) Int. Cl.
| G02B 17/06 | (2006.01) |
| G02B 5/10 | (2006.01) |
| G03B 35/08 | (2021.01) |
| B60R 11/04 | (2006.01) |
| B60R 11/00 | (2006.01) |

(52) U.S. Cl.
CPC .......... *G02B 17/0663* (2013.01); *B60R 11/04* (2013.01); *G02B 5/10* (2013.01); *G03B 35/08* (2013.01); *B60R 2011/0003* (2013.01)

(58) Field of Classification Search
None
See application file for complete search history.

(56) References Cited

U.S. PATENT DOCUMENTS

| 4,060,657 A * | 11/1977 | Iwami | C03C 17/32 |
| | | | 428/524 |
| 5,227,917 A | 7/1993 | Kubo et al. | |
| 5,250,099 A | 10/1993 | Kubo et al. | |
| 5,275,637 A | 1/1994 | Sato et al. | |

(Continued)

FOREIGN PATENT DOCUMENTS

| CN | 1654984 A | 8/2005 |
| CN | 101324676 A | 12/2008 |

(Continued)

OTHER PUBLICATIONS

Machine level translation of JP2001298277.*

(Continued)

*Primary Examiner* — Mohammad J Rahman
(74) *Attorney, Agent, or Firm* — Venable LLP

(57) ABSTRACT

Provided is a reflective optical element that is lightweight and excellent in damping capacity. In the reflective optical element, a resin layer having an optical surface is formed on a metal substrate, and a reflective film is formed on the optical surface, and also, the metal substrate includes an alloy containing Mg as a main component.

30 Claims, 18 Drawing Sheets

(56) References Cited

U.S. PATENT DOCUMENTS

| | | | |
|---|---|---|---|
| 5,396,301 A * | 3/1995 | Sasaki | H04N 5/7441 348/E5.143 |
| 5,613,936 A * | 3/1997 | Czarnek | A61B 1/042 600/173 |
| 5,717,532 A | 2/1998 | Chiba et al. | |
| 5,741,446 A * | 4/1998 | Tahara | B29C 45/1704 425/546 |
| 6,269,223 B1 * | 7/2001 | Lo | H04N 13/218 396/326 |
| 7,016,124 B2 | 3/2006 | Hatakeyama et al. | |
| 7,664,386 B2 | 2/2010 | Ito | |
| 7,682,676 B2 | 3/2010 | Tokuhiro et al. | |
| 7,767,287 B2 | 8/2010 | Tanaka et al. | |
| 7,920,784 B2 | 4/2011 | Ito | |
| 8,603,372 B2 | 12/2013 | Tanaka et al. | |
| 8,637,588 B2 | 1/2014 | Tanaka et al. | |
| 8,976,927 B2 | 3/2015 | Ekstein et al. | |
| 9,295,376 B2 * | 3/2016 | Zipfel | G02B 21/0012 |
| 9,417,365 B2 | 8/2016 | Hisamitsu | |
| 9,551,860 B2 | 1/2017 | Ohmori et al. | |
| 9,961,242 B2 | 5/2018 | Oh | |
| 10,412,274 B2 | 9/2019 | Adachi | |
| 10,737,964 B2 | 8/2020 | Banham et al. | |
| 2003/0072570 A1 * | 4/2003 | Seo | H04N 13/218 348/E13.02 |
| 2003/0191364 A1 * | 10/2003 | Czarnek | A61B 1/00193 600/173 |
| 2004/0264006 A1 * | 12/2004 | Hatakeyama | G02B 17/0663 359/726 |
| 2005/0243568 A1 * | 11/2005 | Rodriguez Barros | B60R 1/1207 362/494 |
| 2005/0248864 A1 | 11/2005 | Tokuhiro et al. | |
| 2007/0003775 A1 * | 1/2007 | Ushino | C08G 61/06 |
| 2007/0127252 A1 | 6/2007 | Fallahi et al. | |
| 2007/0164262 A1 * | 7/2007 | Hirono | B32B 27/325 252/586 |
| 2007/0165300 A1 * | 7/2007 | Sekiguchi | G11B 7/1365 |
| 2008/0187303 A1 | 8/2008 | Ito | |
| 2008/0273191 A1 * | 11/2008 | Kim | G01S 11/12 356/29 |
| 2008/0305254 A1 | 12/2008 | Tanaka et al. | |
| 2009/0135248 A1 * | 5/2009 | Lee | A61B 90/361 348/51 |
| 2009/0280335 A1 | 11/2009 | Tanaka et al. | |
| 2010/0103304 A1 | 4/2010 | Ito | |
| 2011/0051588 A1 * | 3/2011 | Okamura | C09J 11/02 524/556 |
| 2012/0307260 A1 * | 12/2012 | Keshavmurthy | G01B 11/2513 356/601 |
| 2013/0170056 A1 | 7/2013 | Ekstein et al. | |
| 2014/0043706 A1 | 2/2014 | Lynam | |
| 2014/0193144 A1 * | 7/2014 | Coster | F16M 11/10 396/325 |
| 2014/0240822 A1 | 8/2014 | Ohmori et al. | |
| 2014/0285896 A1 | 9/2014 | Hisamitsu | |
| 2016/0097885 A1 | 4/2016 | Comstock, II et al. | |
| 2016/0227078 A1 | 8/2016 | Oh | |
| 2016/0277647 A1 | 9/2016 | Adachi | |
| 2016/0377842 A1 * | 12/2016 | Choi | G02B 13/0065 348/340 |
| 2017/0283915 A1 | 10/2017 | Oishi et al. | |
| 2019/0129035 A1 * | 5/2019 | Valouch | G01S 7/4815 |

FOREIGN PATENT DOCUMENTS

| | | |
|---|---|---|
| CN | 103140801 A | 6/2013 |
| CN | 103782206 A | 5/2014 |
| CN | 103917900 A | 7/2014 |
| CN | 105240765 A | 1/2016 |
| CN | 105437558 A | 3/2016 |
| CN | 205075748 U | 3/2016 |
| CN | 106210469 A | 12/2016 |
| CN | 107074608 A | 8/2017 |
| JP | H05-107407 A | 4/1993 |
| JP | H07-191207 A | 7/1995 |
| JP | 2000-119787 A | 4/2000 |
| JP | 2001-298277 A | 10/2001 |
| JP | 2001-326840 A | 11/2001 |
| JP | 2005-024695 A | 1/2005 |
| JP | 2007-015337 A | 1/2007 |
| JP | 2007-248820 A | 9/2007 |
| JP | 2008-090163 A | 4/2008 |
| JP | 2009-128890 A | 6/2009 |
| JP | 2016-079451 A | 5/2016 |
| JP | 2016-177257 A | 10/2016 |
| JP | 2017-044722 A | 3/2017 |
| JP | 2017-122779 A | 7/2017 |
| KR | 2011-0104397 A | 9/2011 |

OTHER PUBLICATIONS

Machine level translation of JPH05107407.*
Jun. 3, 2021 Chinese Official Action in Chinese Patent Appln. No. 201880054278.3.
Dec. 23, 2021 Chinese Official Action in Chinese Patent Appln. No. 201880054278.3.
Xin Qiming, "Aspheric Surface Manufacturing Technology with Optical Plastics," National Defense Industry Press, Jan. 31, 2005, pp. 1-4.
Feb. 25, 2020 International Preliminary Report on Patentability in International Patent Appln. No. PCT/JP2018/030949.
Nov. 27, 2018 International Search Report in International Patent Appln. No. PCT/JP2018/030949.
Aug. 25, 2022 Office Action in Japanese Patent Application No. 2018-153927 (with English translation).
Apr. 13, 2022 Notice of Allowance in Chinese Patent Application No. 201880054278.3.
Mar. 2, 2023 Japanese Official Action in Japanese Patent Appln. No. 2018-153927.

* cited by examiner

REFLECTIVE OPTICAL ELEMENT AND STEREO CAMERA DEVICE

CROSS-REFERENCE TO RELATED APPLICATIONS

This application is a Continuation of International Patent Application No. PCT/JP2018/030949, filed Aug. 22, 2018, which claims the benefit of Japanese Patent Application No. 2017-161366, filed Aug. 24, 2017, Japanese Patent Application No. 2018-071407, filed Apr. 3, 2018, Japanese Patent Application No. 2018-071408, filed Apr. 3, 2018, and Japanese Patent Application No. 2018-153927, filed Aug. 20, 2018, all of which are hereby incorporated by reference herein in their entirety.

BACKGROUND OF THE INVENTION

Field of the Invention

The present disclosure relates to a reflective optical element excellent in lightweight property and damping capacity, which is used, for example, for automobile use.

Description of the Related Art

A reflective optical system has advantages, for example, in that it is easy to reduce an entire optical system in size, and there is no displacement of imaging caused by a wavelength, as compared to a refracting optical system.

In addition, in recent years, an imaging device has been downsized and increased in performance. Therefore, the imaging device is actively mounted also on moving bodies such as a drone and an automobile, as well as a camera, a video, and a smartphone of the related art, and is utilized for applications with higher accuracy in a wider range such as distance measurement in addition to visual perception of a surrounding environment.

In a case of an automobile, for example, there has also been studied mounting of a camera on the automobile, in addition to an infrared laser scanner and a millimeter-wave radar, so as to implement future automatic driving, and there are also given examples in which ten or more cameras are used in one vehicle. When a camera is used for such application, a lightweight property and a property of being hardly degraded in performance by vibration may be significantly important elements in terms of specifications.

In the reflective optical system, a mirror is mainly used as an optical element. In Japanese Patent Application Laid-Open No. H5-107407, there are disclosed a mirror that is lightweight and relatively inexpensive and a manufacturing method thereof. In this mirror, an aluminum die-cast product is used as a substrate. Soft and hard radiation-curable resin layers are formed on the substrate, and a metal reflective film made of aluminum or the like is further formed on the radiation-curable resin layers.

Although the above-mentioned mirror having a configuration in which aluminum is used for the substrate is lightweight, there may be a problem of degradation in optical performance caused by vibration in applications of moving bodies such as a car, an airplane, a drone, and a vessel and electronic equipment such as a camera and a copying machine each having a physical drive portion in the vicinity of the mirror. This problem is caused because aluminum and an alloy thereof are generally materials having a low damping capacity.

The present disclosure has been made in view of the above-mentioned problem, and provides a reflective optical element that is lightweight and excellent in damping capacity.

SUMMARY OF THE INVENTION

According to the present disclosure, there is provided a reflective optical element comprising a mirror in which a resin layer having an optical surface is provided on a metal substrate, and a reflective film is provided on the optical surface, wherein the metal substrate has formed thereon a first opening for taking in light to a first imaging optical system, a plurality of mirrors of the first imaging optical system, which are configured to reflect the light taken in from the first opening, a second opening for taking in light to a second imaging optical system, and a plurality of mirrors of the second imaging optical system, which are configured to reflect the light taken in from the second opening, and wherein the metal substrate includes an alloy containing Mg as a main component.

Further features of the present disclosure will become apparent from the following description of exemplary embodiments with reference to the attached drawings.

DESCRIPTION OF THE EMBODIMENTS

According to the present disclosure, the problem to be solved by the present disclosure can be solved by the above-mentioned configuration, specifically through the following embodiments.

A reflective optical element according to the present disclosure is a reflective optical element including a mirror in which a resin layer having an optical surface is provided on a metal substrate and a reflective film is provided on the optical surface. There are formed, on the metal substrate, a first opening for taking in light to a first imaging optical system, a plurality of mirrors of the first imaging optical system, which are configured to reflect the light taken in from the first opening, a second opening for taking in light to a second imaging optical system, and a plurality of mirrors of the second imaging optical system, which are configured to reflect the light taken in from the second opening. The metal substrate includes an alloy containing Mg as a main component, more preferably a Mg—Li alloy. The present disclosure is described below in detail based on the embodiments thereof.

First Embodiment

Figure 1:
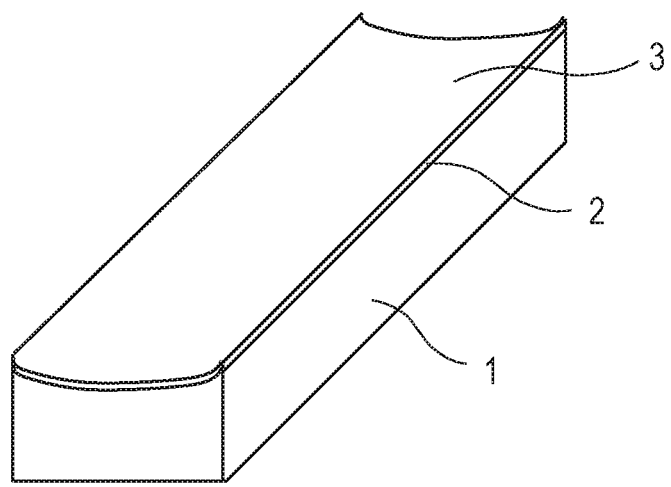
FIG. 1 is a perspective view for illustrating a reflective optical element according to one embodiment of the present disclosure.

A schematic perspective view of one example of a reflective optical element according to a first embodiment of the present disclosure is illustrated in FIG. 1. In FIG. 1, there are illustrated a metal substrate 1 and a resin layer 2 formed on the metal substrate 1, and the resin layer 2 has an optical surface. In this embodiment, the reflective optical element is formed through formation of a reflective film 3 on the optical surface. In this case, the metal substrate 1 includes an alloy containing Mg as a main component, more preferably a Mg—Li alloy.

[Metal Substrate]

The metal substrate 1 in this embodiment is made of an alloy containing Mg as a main component, more preferably a Mg—Li alloy. There is no particular limitation on the Mg—Li alloy, and the Mg—Li alloy is a magnesium-lithium alloy obtained by adding at least lithium to magnesium. The Mg—Li alloy preferably contains 5 mass % or more and 20 mass % or less of lithium and 0.5 mass % or more and 15 mass % or less of aluminum, and may further contain 5 mass % or less of calcium, with the balance being magnesium. That is, the metal substrate 1 contains Mg as a main component, and specifically contains 60 mass % or more of Mg. It is preferred that the amount of inevitable impurities be smaller.

More specifically, there are given alloys such as LAX (trade name; Mg alloy containing Li, Al, and Ca) manufactured by Santoku Co., Ltd. and ALZ (trade name; Mg alloy containing Al, Li, and Zn) manufactured by Anritsu Materials Technology Co., Ltd.

There is no particular limitation on a method of molding a Mg—Li alloy substrate, and the Mg—Li alloy substrate can be molded by various known methods such as casting and injection molding. In general, a substrate subjected to primary processing through casting, injection molding, or the like may be subjected to secondary processing after annealing treatment so as to satisfy desired dimensional accuracy as a substrate and then subjected to rust inhibiting treatment.

It has hitherto been well known that a pure Mg material has a high damping capacity. However, the pure Mg material has low specific strength and is liable to be burned. Therefore, the pure Mg material is inferior in practicality. Meanwhile, an alloyed Mg material, such as AZ91 (9% Al-1% Zn—Mg) or AM60 (6% Al-0.4% Zn—Mg), is a material which is suitably improved in specific strength and the like and has high practicality. However, when the Mg material is alloyed, the high damping capacity of the pure Mg material is lost. The Mg alloy is classified as a dislocation type in the damping alloy classification, but the Mg—Li alloy may belong to another different classification such as a composite type. The inventors of the present disclosure have found specific characteristics thereof. The characteristics can effectively attenuate vibration when the material is used for applications in a moving body or used for a member close to a vibration source, and can effectively reduce degradation of functions inherent to an imaging device or the like.

[Resin Layer]

There is no particular limitation on a material for the resin layer in the present disclosure, and various known resins can be used.

When the resin layer and the optical surface thereof are formed by hot press molding, a pellet, a film, a molten body, or the like of a desired resin is set between a die having a desired optical surface and an alloy containing Mg as a main component, which is to be used as a substrate, more preferably a Mg—Li alloy. Then, the resultant is heated to a melting temperature or higher, to thereby enable pressure molding by a known method.

The resin to be used in the resin layer in the present disclosure is not particularly limited as long as desired characteristics are satisfied, and a known resin, such as an acrylic resin, an ester-based resin, an ether-based resin, an amide-based resin, an imide-based resin, an olefin-based resin, or a fluorine-based resin, may be used. In particular, when deformation of the resin layer by water absorption is to be suppressed, an olefin-based resin may be preferably used, and a cyclic olefin-based resin may be more preferably used.

When the resin layer is formed by radiation curing molding, a desired radiation-curable resin is set and filled between a die having a desired optical surface and an alloy containing Mg as a main component, which is to be used as a substrate, more preferably a Mg—Li alloy, and can be cured with a radiation.

The resin to be used in this case is not particularly limited as long as desired characteristics are satisfied, and a known resin, such as an acrylic resin, an epoxy-based resin, a cyanate-based resin, or a fluorine-based resin, can be used. The acrylic resin and epoxy-based resin can be preferably used in consideration of stability of the optical surface of the resin layer. When the surface accuracy of the optical surface is to be more suitably controlled, a radiation-curable resin having a small curing shrinkage ratio can be used.

There is no particular limitation on the thickness of the resin layer. When there is a concern particularly in distortion of the optical surface caused by thermal expansion, the thickness is preferably 20 µm or more and 2,000 µm or less, more preferably 50 µm or more and 1,000 µm or less. When the thickness of the resin layer is significantly small, the surface roughness of the optical surface may not become desired roughness due to the influence from the surface roughness of an alloy containing Mg as a main component, which is to be used as a substrate, more preferably a Mg—Li alloy. When the thickness of the resin layer is significantly large, the effect of reducing distortion of the optical surface caused by thermal expansion of the resin through support of the substrate is not sufficiently attained, and a desired optical surface may not be maintained in a temperature range of a use environment.

A known procedure, for example, substrate surface treatment and primer treatment can be performed before the resin layer is formed so as to improve adhesiveness between the resin layer and the substrate. In addition, when it is desired that the residual stress caused by molding of the resin layer be reduced in shape stability of the optical surface, annealing treatment may be performed after the resin layer is molded.

[Reflective Film]

As a reflective film to be formed on the optical surface of the resin layer in this embodiment, a known reflective film made of aluminum, silver, chromium, or the like can be used. From the viewpoint of a reflectance, a reflective film made of aluminum or silver can be preferably used, and a reflective film made of silver can be more preferably used. Further, a protective film, a reflection enhancing film, or the like may be formed on the surface of the reflective film, and various known film structures can be used within a range in which desired characteristics are exhibited.

Second Embodiment

Figure 2:
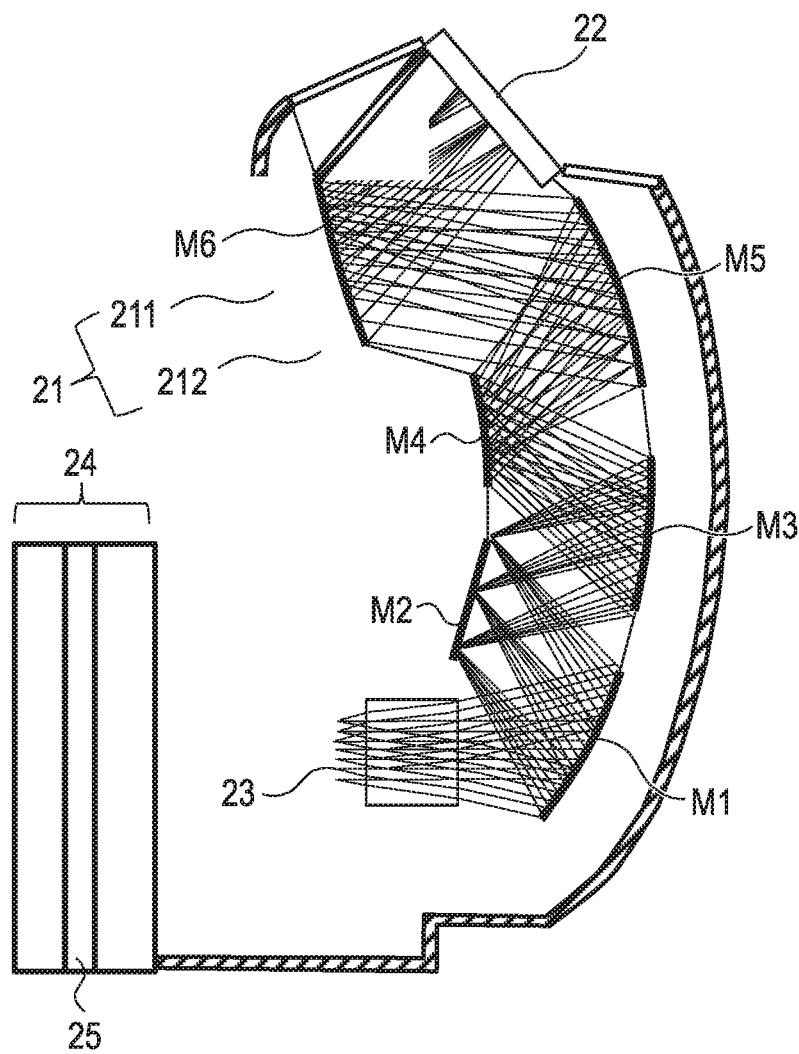
FIG. 2 is a sectional view for illustrating an optical device according to one embodiment of the present disclosure.

A schematic cross-section of one example of an optical device including a coupling portion according to a second embodiment of the present disclosure is illustrated in FIG. 2. FIG. 2 is a view for illustrating one example of the optical device in which an optical portion having a plurality of mirrors is held by the coupling portion. Specifically, there is illustrated an image projection device including a projection optical system configured to enlarge and project an image displayed on an image display panel 23 onto a screen.

In FIG. 2, there are illustrated mirrors M1 to M6 serving as function portions. There is also illustrated a protective glass 22. The mirrors M1 to M6 are positioned by a base portion 21. In this embodiment, there is illustrated, as the base portion 21, an example in which the base portion 21 is formed of a metal portion 211 made of a metal and a resin portion 212 made of a resin. However, the present disclosure is not limited thereto, and the base portion 21 may have any form as long as the base portion 21 can hold the mirrors M1 to M6. The metal portion 211 may have a configuration in which an entirety or at least a part thereof is made of an alloy containing Mg as a main component, more preferably a Mg—Li alloy. In addition, there is also illustrated a coupling portion 24 configured to mount the optical portion including the mirrors M1 to M6 serving as the function portions and the base portion 21 on another member. The coupling portion 24 may be a single member formed integrally with the base portion 21 or may be a member separate from the base portion 21. That is, the optical device according to this embodiment may be formed of the optical portion and the coupling portion.

This embodiment has a feature in that the coupling portion 24 configured to mount the optical portion including the mirrors M1 to M6 serving as the function portions and the base portion 21 on another member is made of an alloy containing Mg as a main component, more preferably a Mg—Li alloy. Alternatively, a part 25 of the coupling portion 24 may be made of an alloy containing Mg as a main component, more preferably a Mg—Li alloy, and the remaining portion may be made of another metal. The coupling portion made of an alloy containing Mg as a main component, more preferably a Mg—Li alloy is excellent in damping capacity and lightweight, and is suitable as a damping member.

The mirrors M1 to M6 serving as the function portions may each be the reflective optical element described in the first embodiment. That is, each of the mirrors M1 to M6 may be a mirror in which a reflective film is formed on a surface of a metal substrate (hereinafter also referred to as "substrate portion") and the substrate portion is made of an alloy containing Mg as a main component, more preferably a Mg—Li alloy.

In addition, each of the mirrors M1 to M6 may be a mirror in which the reflective film is formed directly on the base portion 21 instead of the mirror in which the reflective film is formed on the surface of the substrate portion. In this case, the base portion 21 serves also as the substrate portion.

As the reflective film, a known reflective film made of aluminum, silver, chromium, or the like can be used. From the viewpoint of a reflectance, a reflective film made of aluminum or silver can be preferably used, and a reflective film made of silver can be more preferably used.

A protective film, a reflection enhancing film, and the like may be formed on the surface of the reflective film, and various known film configurations can be used within a range in which desired characteristics are exhibited.

In this embodiment, in the same manner as in the first embodiment, there is no particular limitation on the Mg—Li alloy, and the Mg—Li alloy is a magnesium-lithium alloy obtained by adding at least lithium to magnesium. The Mg—Li alloy preferably contains 5 mass % or more and 20 mass % or less of lithium and 0.5 mass % or more and 15 mass % or less of aluminum, and may further contain 5 mass % or less of calcium, with the balance being magnesium. That is, the Mg—Li alloy contains Mg as a main component, and specifically contains 60 mass % or more of Mg. It is preferred that the amount of inevitable impurities be smaller.

More specifically, there are given alloys such as LAX (trade name) manufactured by Santoku Co., Ltd. and ALZ manufactured by Anritsu Materials Technology Co., Ltd., each having the above-mentioned composition.

Third Embodiment

Figure 3:
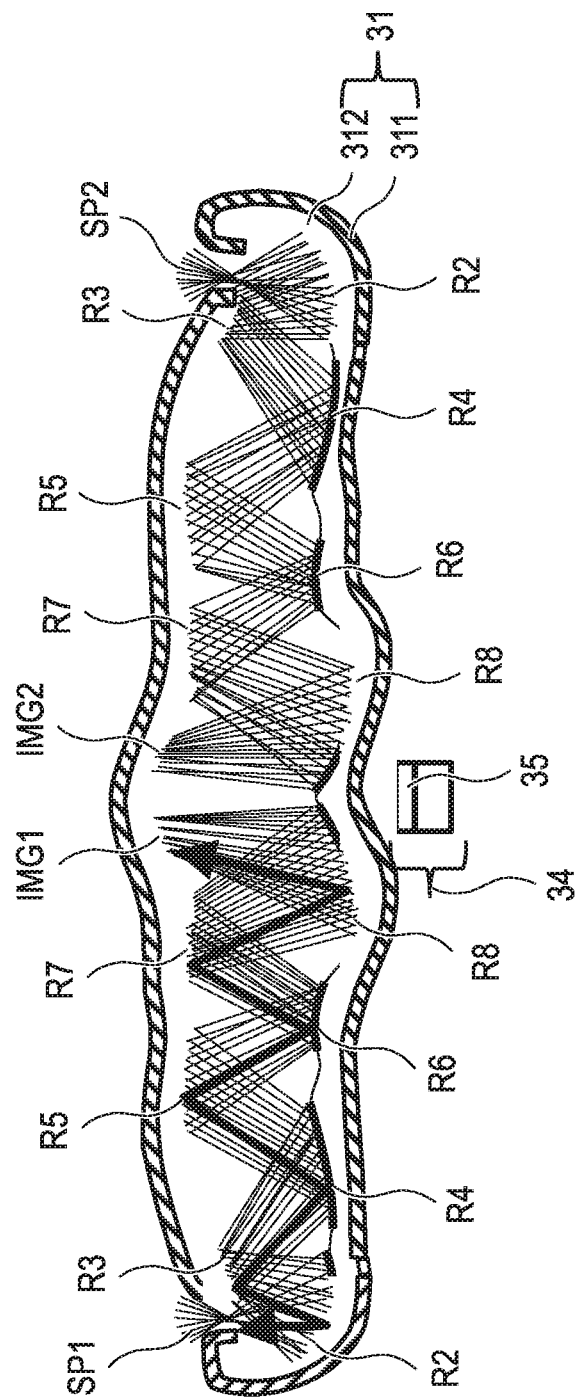
FIG. 3 is a sectional view for illustrating an optical device according to one embodiment of the present disclosure.

A schematic cross-section of a reflective optical element according to a third embodiment of the present disclosure is illustrated in FIG. 3. FIG. 3 is a view for illustrating one example of a stereo camera device in which a metal substrate has formed thereon a first opening for taking in light to a first imaging optical system, a plurality of mirrors of the first imaging optical system, which are configured to reflect the light taken in from the first opening, a second opening for taking in light to a second imaging optical system, and a plurality of mirrors of the second imaging optical system, which are configured to reflect the light taken in from the second opening. Specifically, there is illustrated a schematic cross-section of a device having a shape approximate to an imaging device described, for example, in Japanese Patent Application Laid-Open No. 2017-044722.

In FIG. 3, there is illustrated a state in which light is taken in from each of two openings SP1 and SP2 and is sequentially reflected by reflective surface mirrors R2 to R8 to form an image in each of imaging elements IMG1 and IMG2. The reflective surface mirrors R2 to R8 serve as function portions. The mirrors R2 to R8 are each positioned by a base portion 31. In this embodiment, there is illustrated, as the base portion 31, an example in which the base portion 31 is formed of a metal portion 311 made of a metal and a resin portion 312 made of a resin. However, the present disclosure is not limited thereto, and the base portion 31 may have any form as long as the base portion 31 can hold the mirrors R2 to R8. The metal portion 311 may have a configuration in which an entirety or at least a part thereof is made of an alloy containing Mg as a main component, more preferably a Mg—Li alloy. There is also illustrated a coupling portion 34 configured to mount an optical portion including the mirrors R2 to R8 serving as the function portions and the base portion 31 on another member. The coupling portion 34 may be a single member formed integrally with the base portion 31 or may be a member separate from the base portion 31. That is, the optical device according to this embodiment may be formed of the optical portion and the coupling portion.

This embodiment has a feature in that the coupling portion 34 configured to mount the optical portion including the mirrors R2 to R8 serving as the function portions and the base portion 31 on another member is made of an alloy containing Mg as a main component, more preferably a Mg—Li alloy. Alternatively, a part 35 of the coupling portion 34 may be made of an alloy containing Mg as a main component, more preferably a Mg—Li alloy, and the remaining portion may be made of another metal. The coupling portion made of an alloy containing Mg as a main component, more preferably a Mg—Li alloy is excellent in damping capacity and lightweight, and is suitable as a damping member.

The mirrors R2 to R8 serving as the function portions may each be the reflective optical element described in the first embodiment. That is, each of the mirrors R2 to R8 may be a mirror in which a reflective film is formed on a surface of a metal substrate (hereinafter also referred to as "substrate portion") and the substrate portion is made of an alloy containing Mg as a main component, more preferably a Mg—Li alloy.

In addition, each of the mirrors R2 to R8 may be a mirror in which the reflective film is formed directly on the base portion 31 instead of the mirror in which the reflective film is formed on the surface of the substrate portion. In this case, the base portion 31 serves also as the substrate portion.

As the reflective film, a known reflective film made of aluminum, silver, chromium, or the like can be used. From the viewpoint of a reflectance, a reflective film made of aluminum or silver can be preferably used, and a reflective film made of silver can be more preferably used.

A protective film, a reflection enhancing film, and the like may be formed on the surface of the reflective film, and various known film configurations can be used within a range in which desired characteristics are exhibited. Alternatively, the mirrors serving as the function portions may include a mirror in which the reflective film is formed directly on the base portion 31 instead of being formed of only the mirror in which the reflective film is formed on the surface of the substrate portion as described above. In this case, the base portion 31 serves also as the substrate portion.

In this embodiment, in the same manner as in the first embodiment, there is no particular limitation on the Mg—Li alloy, and the Mg—Li alloy is a magnesium-lithium alloy obtained by adding at least lithium to magnesium. The Mg—Li alloy preferably contains 5 mass % or more and 20 mass % or less of lithium and 0.5 mass % or more and 15 mass % or less of aluminum, and may further contain 5 mass % or less of calcium, with the balance being magnesium. That is, the Mg—Li alloy contains Mg as a main component, and specifically contains 60 mass % or more of Mg. It is preferred that the amount of inevitable impurities be smaller.

More specifically, there are given alloys such as LAX (trade name) manufactured by Santoku Co., Ltd. and ALZ manufactured by Anritsu Materials Technology Co., Ltd., each having the above-mentioned composition.

Now, the present disclosure is further specifically described by way of Examples and Comparative Examples. However, the present disclosure is by no means limited to these Examples.

EXAMPLES (Measurement of Vibration Loss Factor)

In each of the following Examples and Comparative Examples, a vibration loss factor was measured by a vibration damping method (Japanese Industrial Standards (JIS) G0602) as an indicator of a damping capacity of various metal substrates such as a Mg—Li alloy substrate, a Mg alloy substrate, and an Al alloy substrate. The vibration loss factor is a scale indicating damping performance. A higher value of the vibration loss factor means higher damping performance.

Specifically, various metal substrates were each cut into a predetermined size, and both ends of a long side of each metal substrate were held. After that, the metal substrate was vibrated with an electromagnetic coil for vibration and unloaded, and an amplitude displacement amount at the center of the metal substrate after being unloaded was measured with a laser displacement meter. The metal substrate was vibrated through use of an eddy current generated on the surface of a sample by setting a vibration frequency in this case to a resonance frequency of each of the various metal substrates, an internode distance to 40 mm, a coil inductance to 101 K (100 μH), and a voltage to a sine wave of 1 Vp-p.

A vibration loss factor was determined from a measured value of time dependency of the obtained amplitude displacement amount by the following Expression 1.

$$y = e^{-\pi f \eta x} \quad \text{(Expression 1)}$$

where x represents a time; y represents an amplitude displacement amount; f represents a vibration number; and η represents a vibration loss factor.

Example 1

A vibration loss coefficient was determined by the above-mentioned method through use of a Mg—Li alloy substrate (LAX 1491 (trade name) manufactured by Santoku Co., Ltd.; 14% Li-9% Al-1% Ca—Mg) having a size of 90 mm×10 mm×0.5 mm (vibration frequency: 1.04 kHz). The results are shown in Table 1. In addition, the specific gravity of LAX 1491 (trade name) is also shown in Table 1.

Example 2

A vibration loss coefficient was determined by the above-mentioned method through use of a Mg alloy substrate (AZ 91 (9% Al-1% Zn—Mg)) having a size of 98 mm×10 mm×2 mm (vibration frequency: 2.82 kHz). The results are shown in Table 1. In addition, the specific gravity of AZ 91 is also shown in Table 1.

Comparative Example 1

A vibration loss coefficient was determined by the above-mentioned method through use of an Al—Si—Mg-based aluminum alloy substrate (AC4C (7.5% Si-0.45% Mg—Al) having a size of 98 mm×10 mm×2 mm (vibration frequency: 3.30 kHz). The results are shown in Table 1. In addition, the specific gravity of AC4C is also shown in Table 1.

TABLE 1

|  | Vibration loss factor | Specific gravity ($g/cm^3$) |
| --- | --- | --- |
| Example 1 | 2.74 | 1.44 |
| Example 2 | 0.44 | 1.83 |
| Comparative Example 1 | 0.33 | 2.68 |

It was found from the above-mentioned results that, when at least a part of a predetermined member is made of an alloy containing Mg as a main component, more preferably a Mg—Li alloy, a reflective optical element and a damping member which are lightweight and have a high damping capacity can be obtained.

Fourth Embodiment

Now, a stereo camera device according to a fourth embodiment of the present disclosure and a manufacturing method thereof are described with reference to the drawings. According to the fourth embodiment, a small stereo camera device, in which a decrease in accuracy of stereo measurement is suppressed even when the stereo camera device is locally heated or cooled, can be provided at low cost.

(Stereo Camera Main Body)

Figure 4A:
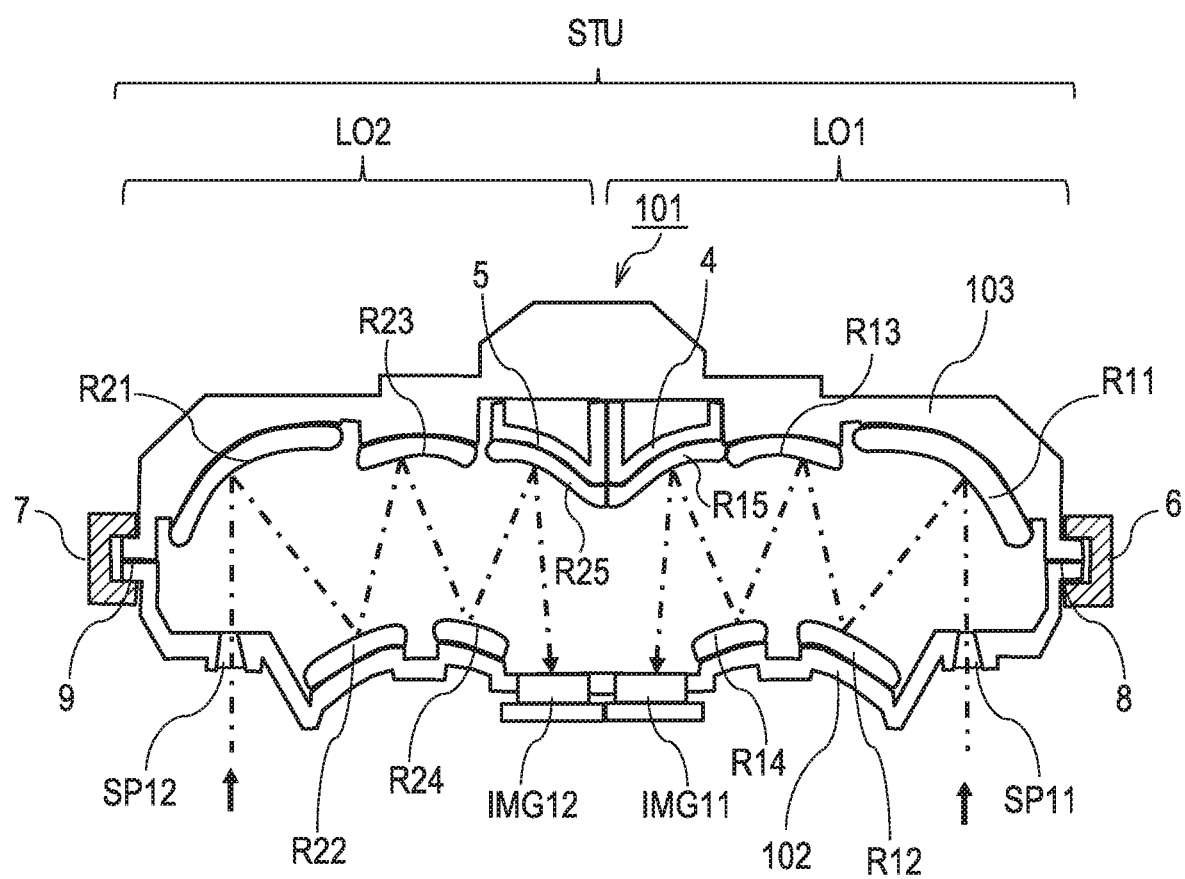
FIG. 4A is a schematic sectional view of a stereo camera main body in the embodiment of the present disclosure.

FIG. 4A is a schematic sectional view for illustrating a basic configuration of a stereo camera main body according to the fourth embodiment.

A stereo camera main body 101 includes a stereo imaging optical system STU, and the stereo imaging optical system STU includes a first imaging optical system LO1 on the right side of the figure and a second imaging optical system LO2 on the left side thereof.

The first imaging optical system LO1 includes an opening SP11 serving as a first opening for taking in ambient light, a reflective surface R11, a reflective surface R12, a reflective surface R13, a reflective surface R14, and a reflective surface R15. The second imaging optical system LO2 includes an opening SP12 serving as a second opening for taking in ambient light, a reflective surface R21, a reflective surface R22, a reflective surface R23, a reflective surface R24, and a reflective surface R25. Each of the reflective surfaces is formed as a free curved surface mirror. The opening SP11 and the opening SP12 may be used as diaphragms of the first imaging optical system LO1 and the second imaging optical system LO2, respectively.

In FIG. 4A, each reference axis (central principal ray) of the first imaging optical system LO1 and the second imaging optical system LO2 is represented by the alternate long and short dash line, and two off-axial optical systems in which the reference axes are bent by a plurality of tilted reflective surfaces are configured. It is preferred that the first imaging optical system LO1 and the second imaging optical system LO2 be configured so as to be symmetric to each other on the right and left sides for the following reasons. When field angles of the optical systems on the right and left sides are different from each other, the range in which a distance can be measured by stereo measurement is determined by the imaging optical system having a smaller field angle. In addition, when there is a difference in F-number and focal length between the two optical systems, there is a risk in that the accuracy of distance measurement may be decreased.

The stereo camera main body 101 includes a first metal substrate (first metal frame) 102 and a second metal substrate (second metal frame) 103, and the first imaging optical system LO1 and the second imaging optical system LO2 are mounted on the metal substrates as described below.

There are formed, on the first metal substrate 102, the opening SP11 serving as a diaphragm surface for taking in ambient light to the first imaging optical system LO1 and the reflective surface R12 and the reflective surface R14 forming a part of the first imaging optical system LO1. In addition, there are formed, on the first metal substrate 102, the opening SP12 serving as a diaphragm surface for taking in ambient light to the second imaging optical system LO2, and the reflective surface R22 and the reflective surface R24 forming a part of the second imaging optical system LO2. Further, on the first metal substrate 102, an image sensor IMG11 is fixed to a position corresponding to an imaging surface of the first imaging optical system LO1, and an image sensor IMG12 is fixed to a position corresponding to an imaging surface of the second imaging optical system LO2.

As the image sensor, for example, an imaging element having sensitivity to visible light (wavelength: 380 nm to 700 nm), such as a CMOS image sensor or a CCD image sensor, is used. It is further preferred that the image sensor be an imaging element capable of receiving light in a wavelength band (for example, a near-infrared region in the vicinity of 1,000 nm) different from that of visible light in addition to visible light and converting the received light into an electric signal. In the case of an imaging optical system in which an optical surface having a refractive power (optical power) is formed of only a reflective surface as in this embodiment, a chromatic aberration is not present, and hence high imaging performance can be maintained in a wavelength band wider than that of an imaging optical system formed of a refracting optical system. Thus, when the light receiving wavelength range of the imaging element is large, information other than visible light can also be simultaneously obtained. Thus, the imaging optical system in which an optical surface having a refractive power (optical power) is formed of only a reflective surface is preferred because the entire system can be downsized as compared to a camera system having an infrared camera device separately mounted thereon.

There are formed, on the second metal substrate 103, the reflective surface R11 and the reflective surface R13 forming a part of the first imaging optical system LO1, and the reflective surface R21 and the reflective surface R23 forming a part of the second imaging optical system LO2.

In addition, a supporting base 4 made of a metal and a supporting base 5 made of a metal are set to the second metal substrate 103, and the supporting base 4 and the supporting base 5 can be independently adjusted for position and posture. The final reflective surface R15 of the first imaging optical system LO1 is formed on the supporting base 4, and the final reflective surface R25 of the second imaging optical system LO2 is formed on the supporting base 5. The reflective surface R15 and the reflective surface R25 are supported so as to be adjusted for position and posture through intermediation of the supporting base 4 and the supporting base 5 so that an image is suitably formed from each of the imaging optical systems on each of imaging surfaces of the image sensor IMG11 and the image sensor IMG12.

The first metal substrate 102 and the second metal substrate 103 are aligned with each other and fixed to each other under a state in which both ends thereof are tightly held by a fixing member 6 and a fixing member 7, to thereby form a unit (to be united). The first metal substrate 102 and the second metal substrate 103 are positioned and fixed to each other so that the reflective surfaces formed on the two metal substrates are opposed to each other to form two off-axial optical systems on the right and left sides. The plurality of reflective surfaces forming the first imaging optical system LO1 and the second imaging optical system LO2 each have a rotationally asymmetric curvature and are arranged to be opposed to each other under a state of being tilted so that a reference axis is bent. Through formation of such reflective surfaces, aberration can be more easily corrected, and imaging performance can be improved. In this embodiment, the reflective surfaces and the diaphragm surfaces of the imaging optical systems on the right and left sides are respectively formed integrally with the same metal substrates, and hence it is not required to adjust the positions of the two imaging optical systems at a time of assembly.

Figure 5:
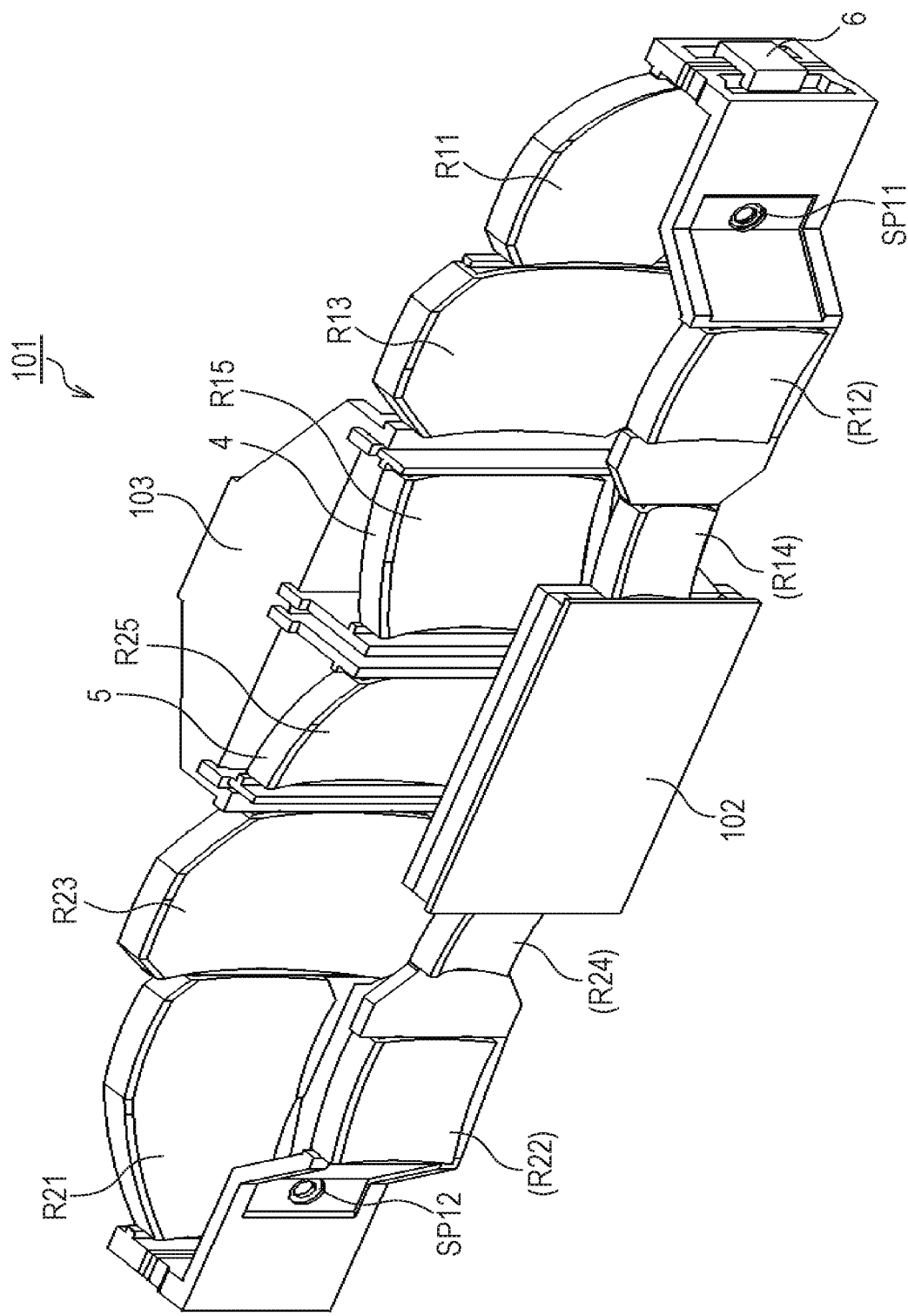
FIG. 5 is an external perspective view of the stereo camera main body in the embodiment of the present disclosure.
Figure 6:
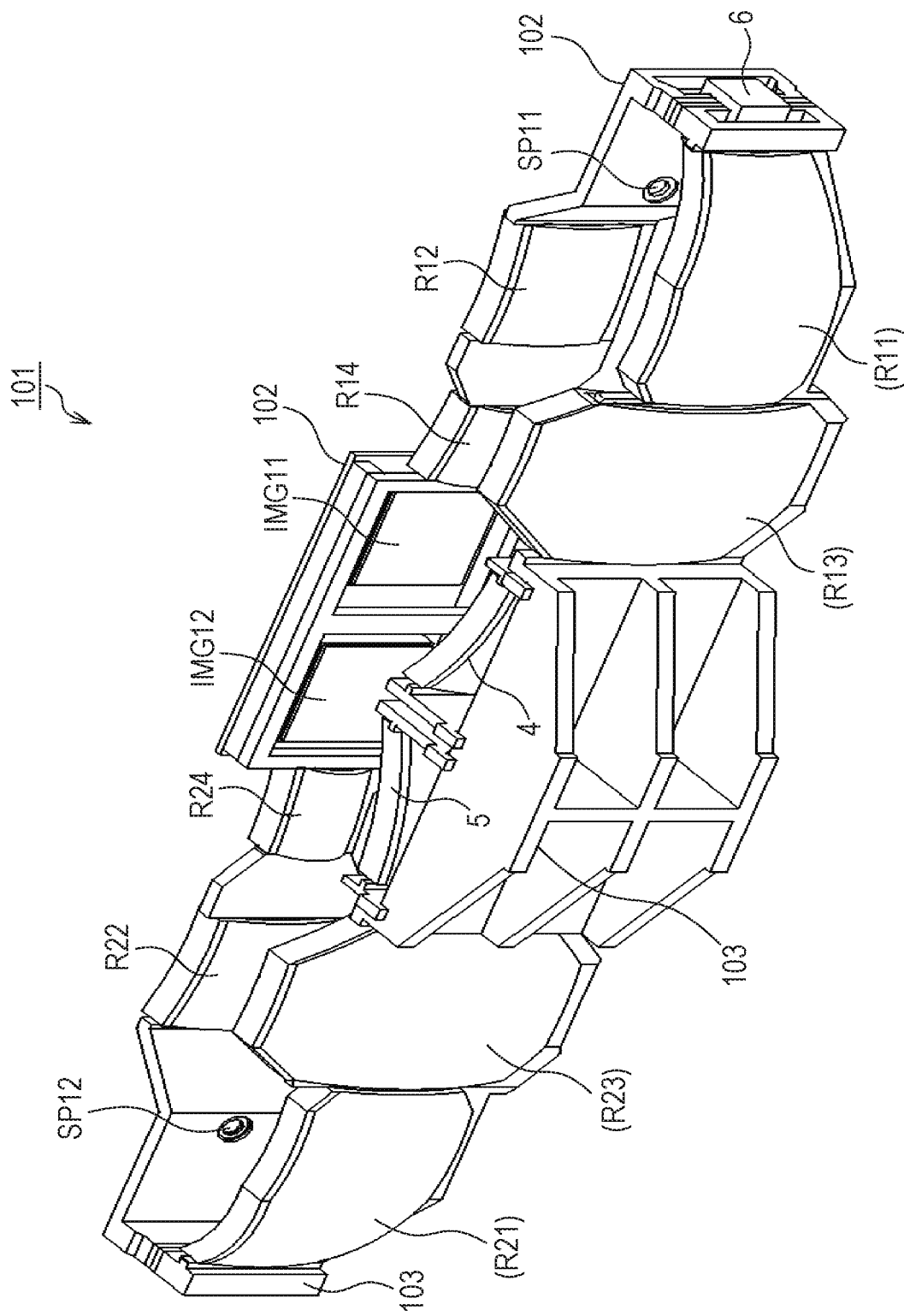
FIG. 6 is an external perspective view of the stereo camera main body in the embodiment of the present disclosure.

For easy understanding of the structure of the stereo camera main body 101, external perspective views of the stereo camera main body 101 are illustrated in FIG. 5 and FIG. 6. FIG. 5 is a perspective view when viewed from an angle at which the odd-numbered reflective surfaces can be seen, and FIG. 6 is a perspective view when viewed from an angle at which the even-numbered reflective surfaces and the imaging surfaces of the image sensors can be seen. The even-numbered reflective surfaces in FIG. 6 and the odd-numbered reflective surfaces in FIG. 5 are formed at positions that are not directly seen, and the reference symbols of the reflective surfaces are illustrated with parentheses on the rear sides of the metal substrates at the positions at which the reflective surfaces are arranged.

(Reflective Surface)

Next, the reflective surfaces formed on the metal substrates and the supporting bases made of a metal in the embodiment are described. The surface of a base material of the metal substrate or the supporting base made of a metal can also be used as the reflective surface. However, in this case, an advanced processing technology is required to process the surface into a reflective surface having a rotationally asymmetric curvature and a high reflectance, and mass production cannot be expected. Thus, using the surface of the base material as the reflective surface is not realistic.

Figure 4B:
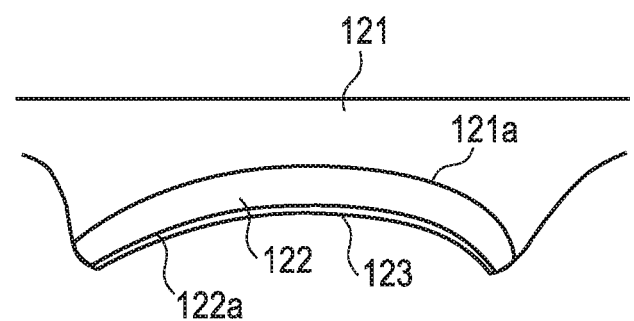
FIG. 4B is a schematic sectional view for illustrating a configuration of a reflective surface in the embodiment of the present disclosure.

In view of the foregoing, in this embodiment, as illustrated in FIG. 4B, a resin portion having high shape accuracy is formed on the surface of a metal substrate or a supporting base made of a metal, which is a base, and a reflective film made of, for example, a metal is formed on the resin portion to be used as a reflective surface.

FIG. 4B is a schematic sectional view for illustrating a configuration of the reflective surface in this embodiment, and there are illustrated a base material 121, a resin portion 122, and a reflective film 123. The base material 121 illustrated in the figure is a metal substrate or a supporting base made of a metal. A curved surface 121*a* imitating the shape of the reflective surface is formed on the base material 121. However, it is not required that the curved surface 121*a* be formed with high shape accuracy, and the curved surface 121*a* may be, for example, a rough surface. The resin portion 122 is a portion formed at a predetermined position on the base material 121 with a resin through use of, for example, an insert molding technology. A curved surface 122*a* having a rotationally asymmetric curvature is formed with high accuracy on the surface of the resin portion 122, for example, by a method involving transferring a die surface. The reflective film 123 is formed on the curved surface 122*a* with high accuracy, for example, by a method involving vapor-depositing a metal.

It is difficult to form all the reflective surfaces of the two imaging optical systems on a single metal substrate in consideration of methods of manufacturing the resin portion and the reflective film. Therefore, in this embodiment, the reflective surfaces are arranged on the two metal substrates and the two supporting bases.

Figure 7:
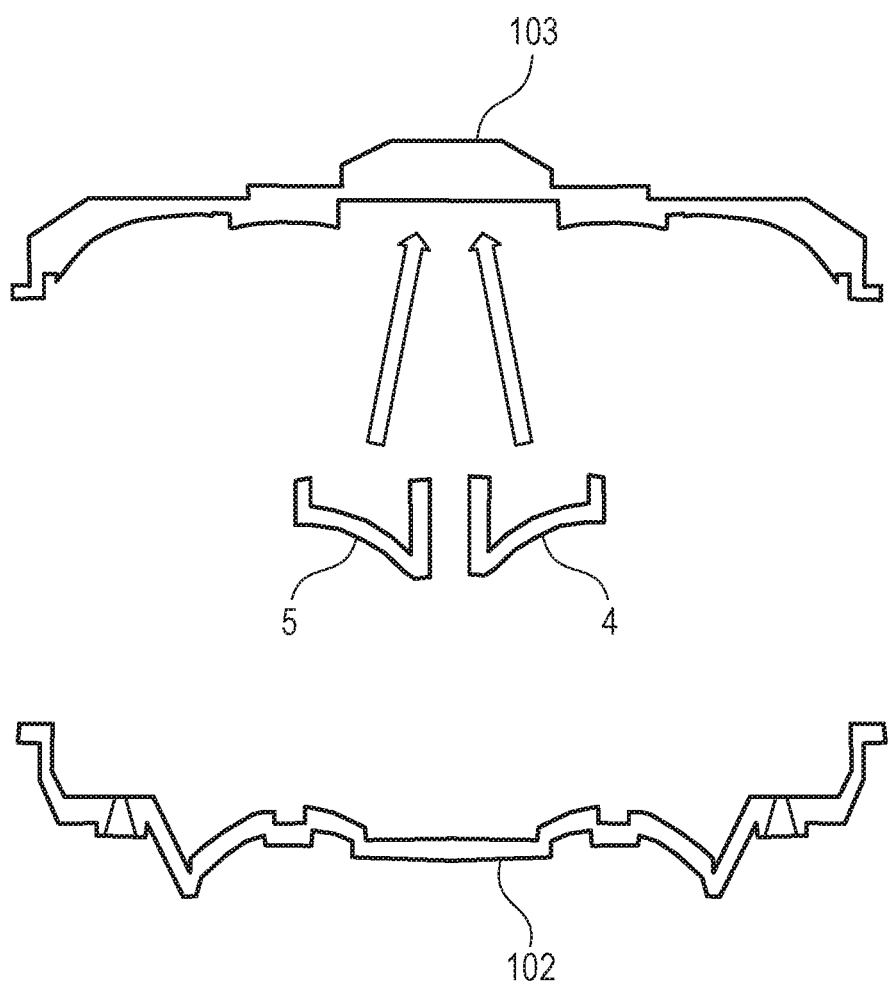
FIG. 7 is a view for illustrating a configuration of a metal substrate of the stereo camera main body in the embodiment of the present disclosure.

Specifically, as illustrated in FIG. 7, the metal substrate 102 on which the reflective surfaces configured to reflect light at the even-numbered turns counted from an incidence side and the metal substrate 103 on which the reflective surfaces configured to reflect light at the odd-numbered turns counted from the incidence side are arranged in separate frames. Further, the supporting base 4 and the supporting base 5 on which the final reflective surfaces are formed are provided. When it is not required to perform alignment of the imaging optical systems and the image sensors through adjustment of the positions and postures of the final reflective surfaces, the final reflective surfaces may also be formed on the metal substrate 103. Through the configuration in which the even-numbered reflective surfaces and the odd-numbered reflective surfaces opposed to each other are arrayed and arranged respectively on one surfaces of different frames, formation of the resin portion and the reflective film can be performed with high accuracy at low cost through use of general manufacturing technologies such as insert molding and vapor deposition.

(Heat Conduction Path)

Next, a heat conduction path included in the stereo camera main body 101 in this embodiment is described with reference to FIG. 4A.

When a temperature distribution occurs in the stereo camera main body due to local heating or cooling from an external environment, expansion or contraction occurs in each portion of the unit, and there is a risk in that the imaging optical systems may not exhibit predetermined performance. When each frame of the stereo camera main body is made of a metal excellent in heat conductivity, the temperature distribution in each frame is kept small. The problem lies in the case in which a temperature difference occurs between the first metal substrate 102 and the second metal substrate 103. In this case, there occurs a change in relative position and direction or reflective surface shape in the relationship between the reflective surfaces configured to reflect light at the odd-numbered turns and the reflective surfaces configured to reflect light at the even-numbered turns, and there is a risk in that the imaging characteristics may be influenced.

In view of the foregoing, in this embodiment, the first metal substrate 102 and the second metal substrate 103 are brought into abutment against each other with satisfactory heat conduction at both end portions so that a large temperature difference does not occur between the metal substrates. That is, the first metal substrate 102 and the second metal substrate 103 are fixed to each other through use of the fixing member 6 and the fixing member 7 that are thermally conductive members so that a plurality of heat conduction paths having satisfactory heat conduction are formed through direct contact between the metal substrates. In FIG. 4A, the first metal substrate 102 and the second metal substrate 103 are brought into abutment against each other in an abutment portion 8 and an abutment portion 9, and two heat conduction paths configured to satisfactorily conduct heat are formed.

It is appropriate that portions at which the first metal substrate 102 and the second metal substrate 103 are to be brought into contact with each other be subjected to mirror processing or the like so as to have enhanced surface flatness so that each contact area becomes sufficiently large in the abutment portion 8 and the abutment portion 9. In addition, when rough surfaces that do not have high flatness are brought into abutment against each other, each total area of the abutment portion 8 and the abutment portion 9 is ensured so that a substantially sufficient contact area can be obtained. That is, the heat conductance between the first metal substrate 102 and the second metal substrate 103 can be ensured to be sufficiently large by providing the abutment portion having a size (total area) that enables a required contact area to be obtained in consideration of flatness.

(Another Mode of Heat Conduction Path)

In the embodiment of FIG. 4A, opposed surfaces are brought into direct contact with each other at end portions of the metal substrates so as to form a heat conduction path having satisfactory heat conduction between the first metal substrate 102 and the second metal substrate 103. The embodiment of the present disclosure is not limited thereto. In other words, it is only required that a heat conduction path that sufficiently increases the heat conduction between the first metal substrate 102 and the second metal substrate 103 be formed.

A method of forming a heat conduction path that sufficiently increases the heat conductance and a formation position thereof are described below.

First, the method of forming a heat conduction path is not limited to contact between the surfaces of the metal substrates as described above. For example, the first metal substrate 102 and the second metal substrate 103 may be brought close to each other or may be brought into local abutment against each other, and a thermally conductive member may be arranged in a gap therebetween or on the periphery of the abutment portion.

As the thermally conductive member, there can be used, for example, greases such as a silver grease, a ceramic grease, a carbon grease, and a nanodiamond grease containing thermally conductive fine particles and a heat conductive gel. In addition, a sheet-shaped heat conductive material, such as a heat conductive sheet or a heat conductive tape, may be interposed between the first metal substrate 102 and the second metal substrate 103.

In addition, a heat conduction path may be formed of a fixing member configured to fix the first metal substrate 102 and the second metal substrate 103 to each other. For example, the first metal substrate 102 and the second metal substrate 103 may be fixed to each other through use of a heat conductive adhesive as a fixing member after the first metal substrate 102 and the second metal substrate 103 are aligned with each other. From the viewpoint of increasing the heat conductance between the first metal substrate 102 and the second metal substrate 103, a preferred heat conductivity of the heat conductive adhesive is 0.1 [W/mK] or more and 5.0 [W/mK] or less. Alternatively, the first metal substrate 102 and the second metal substrate 103 may be fixed to each other by being held like a clip through use of the fixing member 6 and the fixing member 7 as elastic metal jigs having satisfactory heat conductivity. Needless to say, the metal jig is not limited to the elastic metal member. The first metal substrate 102 and the second metal substrate 103 may be fixed to each other by caulking through use of a metal material that is plastically deformed, or a heat conduction path may be formed through use of a mechanical fixing tool using metal bolts and nuts or the like.

In addition, the heat conductive member may be provided at a position separate from the fixing portion and abutment portion of the metal substrates. For example, the first metal substrate 102 and the second metal substrate 103 may be covered with a metal foil, a heat conductive sheet, or the like so that the first metal substrate 102 and the second metal substrate 103 are brought into contact with each other. Alternatively, the first metal substrate 102 and the second metal substrate 103 may be bound by a heat conductive member such as a metal wire or a carbon fiber so that the first metal substrate and the second metal substrate are bound to each other.

The formation position of the heat conductive member is not limited to the end portions of the metal substrates illustrated in FIG. 4A, and may be provided on an inner side from the end portions. From the viewpoint of ease of mounting, it is preferred that each heat conductive member be provided on an outer side from the opening SP11 and the opening SP12 of the first metal substrate 102, that is, on each end portion side of the metal substrates.

In addition, the first imaging optical system LO1 and the second imaging optical system LO2 are formed so as to be linearly symmetric to each other, and hence it is desired that the heat conduction paths be also arranged so as to be symmetric along a direction in which the first imaging optical system and the second imaging optical system are arrayed. This is because, even when a temperature distribution occurs in the stereo imaging optical system STU, stereo measurement is less influenced when the temperature distribution occurs symmetrically in the first imaging optical system LO1 and the second imaging optical system LO2.

In addition, as illustrated in FIG. 4A, the heat conductive member is not limited to the mode in which the heat conductive member is provided in only one portion on each side of the first imaging optical system LO1 and the second imaging optical system LO2, and the heat conductive members may be provided in a larger number of portions. In this case, a plurality of the above-mentioned methods of forming a heat conductive path may be combined to be used.

Figure 8:
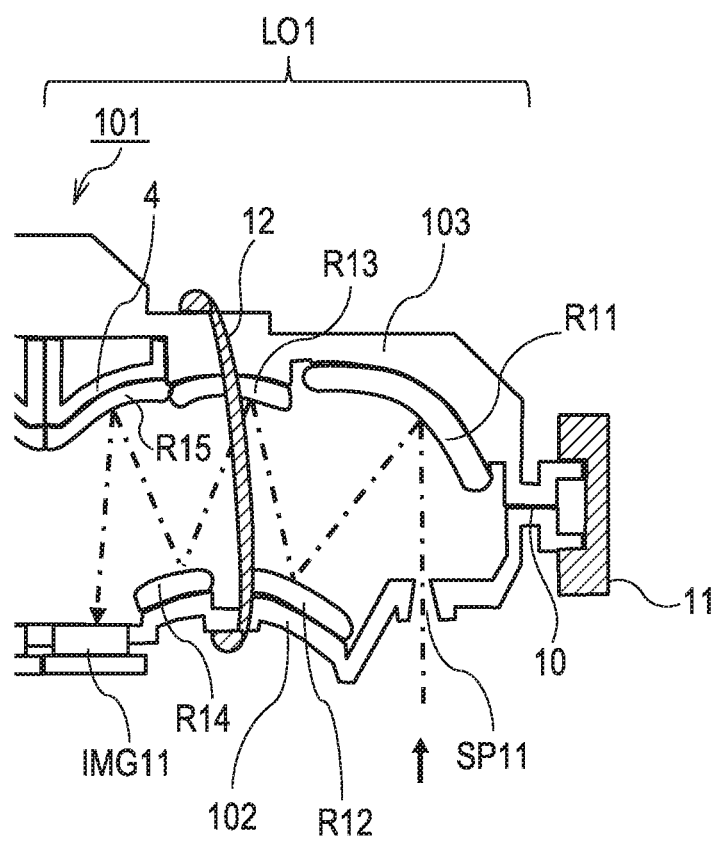
FIG. 8 is a schematic partial sectional view of an Example in which a plurality of heat conduction paths are provided.

FIG. 8 is a view for schematically illustrating one example in which heat conductive members are provided in a plurality of portions. For convenience of illustration, only the first imaging optical system LO1 side is illustrated, but the heat conduction path is formed also on the second imaging optical system LO2 side so as to be linearly symmetric to that on the first imaging optical system LO1 side.

In the example illustrated in FIG. 8, heat conduction paths are arranged in three portions on the first imaging optical system LO1 side. First, there is provided an abutment portion 10 in which the first metal substrate 102 and the second metal substrate 103 are brought into abutment against each other on an outer side of the opening SP11. That is, a heat conduction path is arranged between the opening SP11 and the end portions of the metal substrates. On a further outer side thereof, there is provided a fixing tool 11 made of a metal configured to hold and fix the end portions of the first metal substrate 102 and the second metal substrate 103 to each other. That is, a heat conductive member formed of the fixing tool 11 made of a metal is arranged on an outer side from the end portions of the metal substrates.

In addition, on an inner side from the opening SP11, that is, on a side opposite to the end portion of the first metal substrate 102 across the opening SP11, there is provided a heat conduction path formed of a heat conductive member that is a wire member 12 made of a metal on an outer surface of the first metal substrate 102 and an outer surface of the second metal substrate 103.

As described above, through arrangement of a plurality of heat conduction paths in each imaging optical system of the stereo imaging optical system, the occurrence of a temperature distribution can be further effectively reduced.

(Stereo Camera Device)

Next, a stereo camera device having the stereo camera main body 101 mounted thereon is described. The stereo camera device includes a housing configured to protect the stereo camera main body 101 so as to prevent unnecessary ambient light, dust, and the like from entering the stereo camera main body 101 and to prevent the stereo camera main body 101 from being brought into direct contact with an external object.

In this embodiment, the stereo camera main body 101 is mounted in a housing with a dual structure so as to enhance protection performance and to suppress the influence of heating and cooling from an external environment on the stereo camera main body 101.

Figure 9:
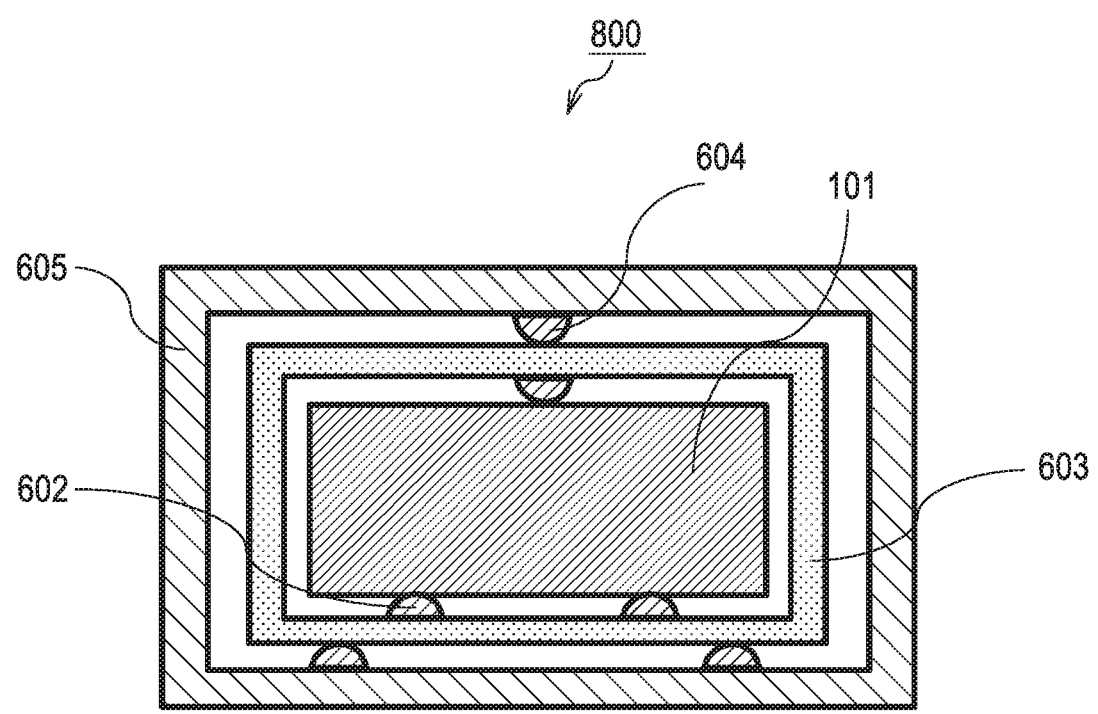
FIG. 9 is a sectional view for schematically illustrating a housing with a dual structure in the embodiment of the present disclosure.

FIG. 9 is a sectional view for schematically illustrating a housing with a dual structure. There are illustrated a stereo camera device 800, a stereo camera main body 101, an inner housing 603, and an outer housing 605. The stereo camera main body 101 is accommodated in the inner housing 603 and supported and fixed under a state of being separated from the inner housing 603 with a gap being formed therebetween through use of a plurality of support members 602. The inner housing 603 is supported and fixed under a state of being separated from the outer housing 605 with a gap being formed therebetween through use of a plurality of support members 604. The support members 602 and the support members 604 each have a structure in which one end is brought into contact with and support a mating member with a point or a minute area. Thus, through dual formation of the gaps and use of the plurality of supports each having a small contact area, a thermal insulation property between the external environment and the stereo camera main body 101 can be enhanced. Therefore, even when the stereo camera device 800 is locally heated or cooled with direct sunlight or cold air from outside, the thermal influence on the stereo camera main body 101 can be reduced.

Specifically, in combination of the housing with a dual structure and the heat conduction paths included in the stereo camera main body 101, even when the stereo camera device 800 according to this embodiment is heated or cooled from the external environment, the occurrence of a temperature distribution in the stereo camera main body 101 is suppressed. Even when the temperature environment is changed, a change in optical characteristics of the stereo imaging optical system is small. Therefore, a stereo image reflecting a proper parallax can be stably obtained, and the accuracy of stereo measurement can be maintained.

Figure 10:
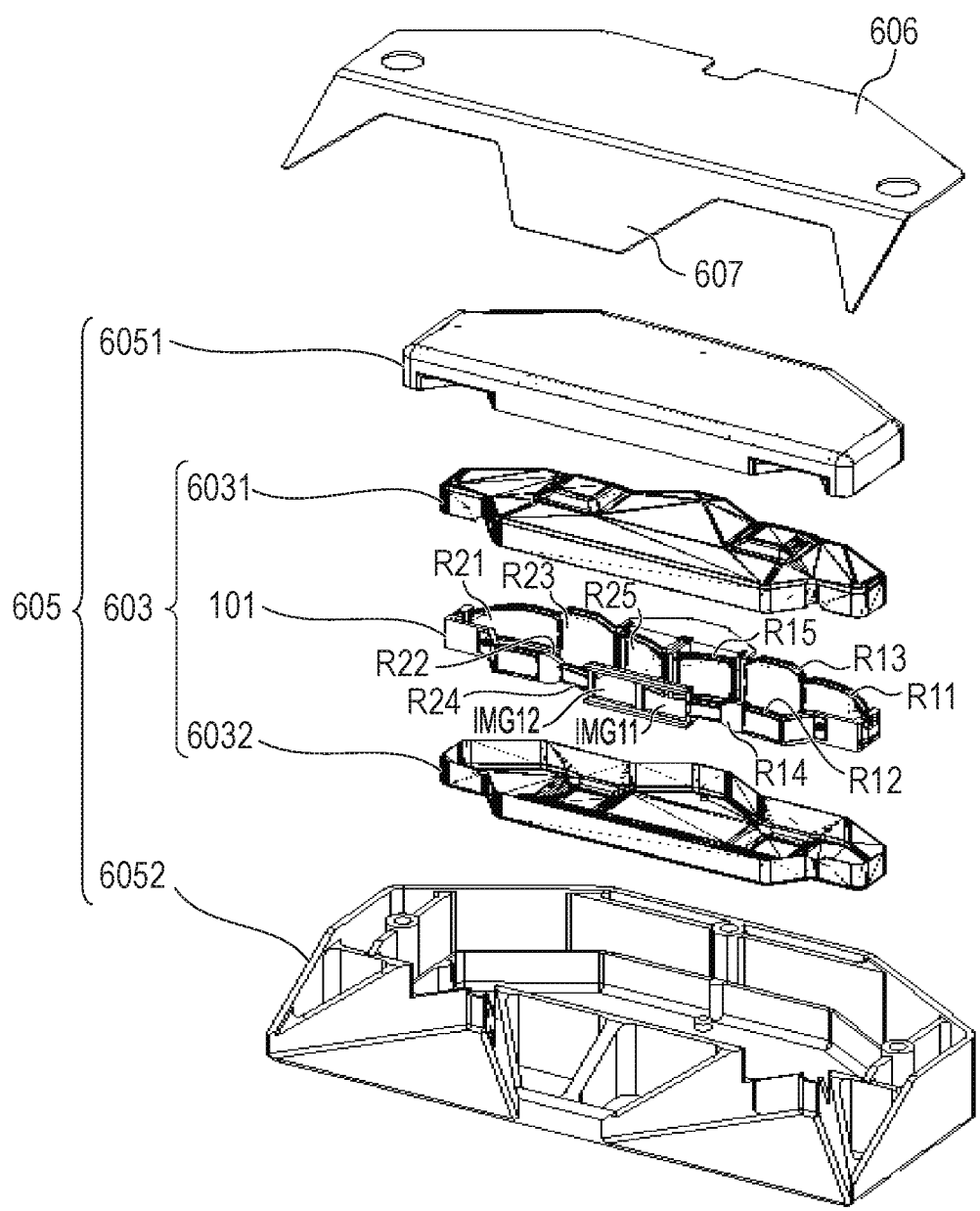
FIG. 10 is a view for illustrating a specific configuration of the housing with a dual structure in the embodiment of the present disclosure.

Next, a specific configuration of the housing with a dual structure included in the stereo camera device 800 according to the embodiment is illustrated in FIG. 10. As illustrated, the inner housing 603 includes an inner housing upper member 6031 and an inner housing lower member 6032. The stereo camera main body 101 is supported so as to be held by the inner housing upper member 6031 and the inner housing lower member 6032. In addition, the outer housing 605 includes an outer housing upper member 6051 and an outer housing lower member 6052, and the outer housing 605 is configured to support the inner housing 603 so as to hold the inner housing 603 with the outer housing upper member 6051 and the outer housing lower member 6052.

An attachment member 606 configured to mount the stereo camera device on a windshield of an automobile or the like is joined to an upper portion of the outer housing 605. A slant surface 607 of the attachment member 606 is adjusted for shape so as to be brought into close contact with the windshield on which the stereo camera device is to be mounted.

Figure 11:
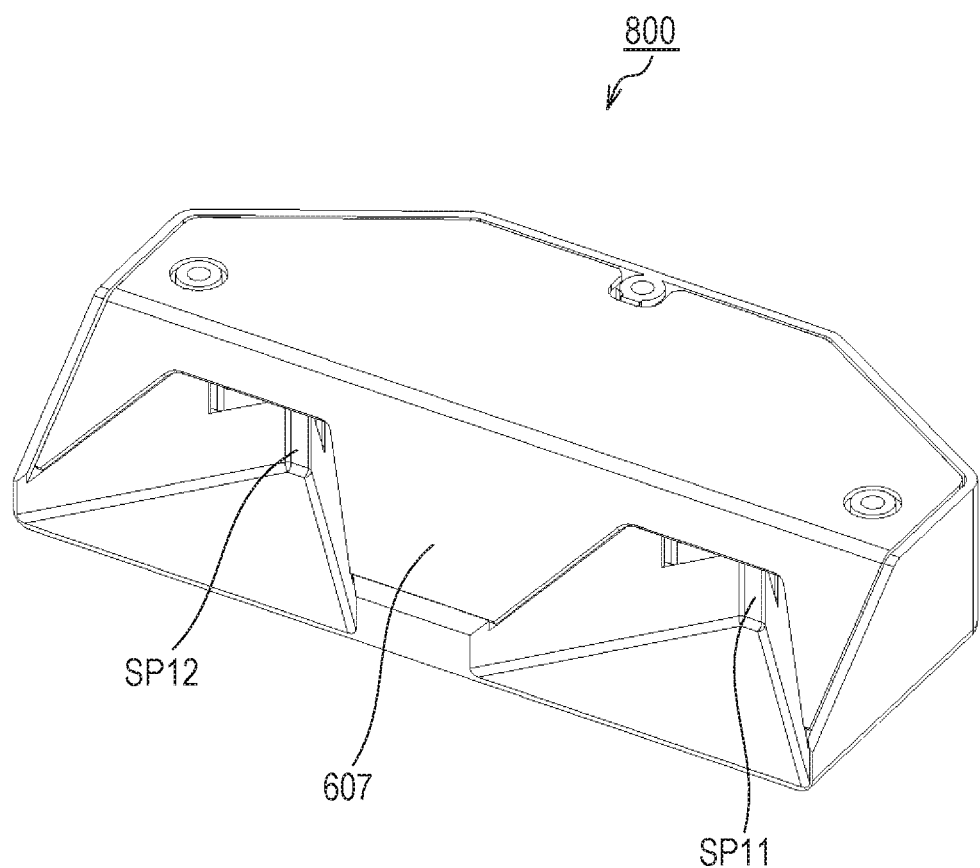
FIG. 11 is an external perspective view of a stereo camera device according to an embodiment of the present disclosure.
Figure 12:
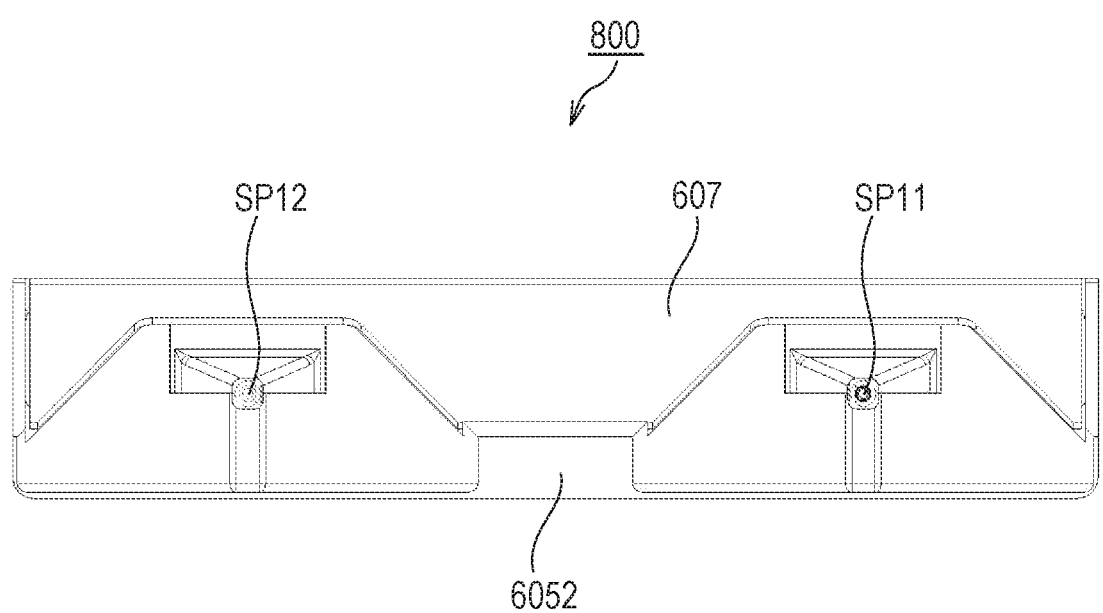
FIG. 12 is a front view of the stereo camera device according to the embodiment of the present disclosure.

FIG. 11 is an external perspective view of the stereo camera device 800, and FIG. 12 is a front view of the stereo camera device 800. As illustrated, openings each widening toward ends are formed on a front surface side of the inner housing, the outer housing, and the attachment member so that ambient light having a predetermined field angle enters the opening SP11 and the opening SP12 of the stereo camera main body.

Figure 13A:
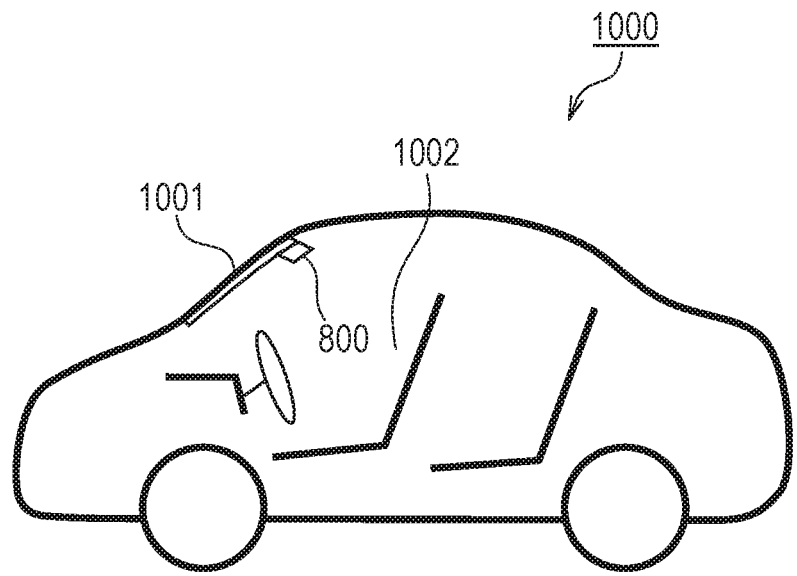
FIG. 13A is a view of a closed automobile having the stereo camera device according to the embodiment of the present disclosure mounted thereon.
Figure 13B:
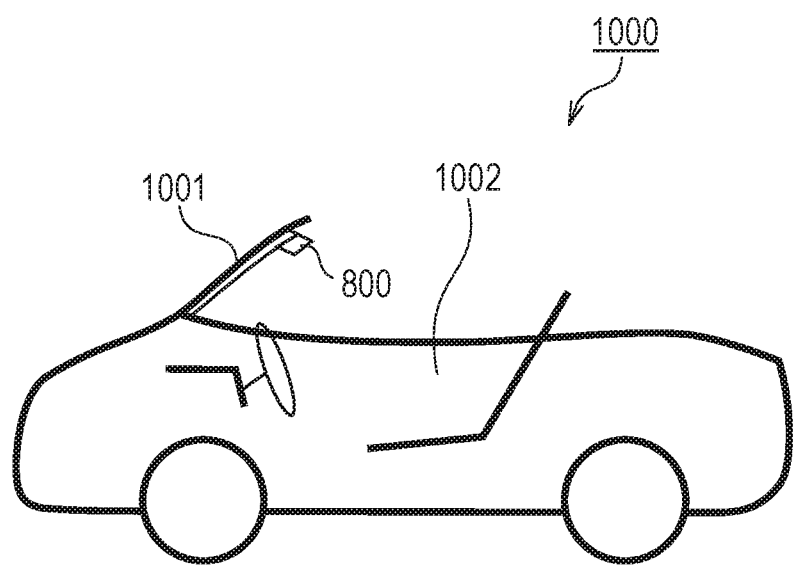
FIG. 13B is a view of an open automobile having the stereo camera device according to the embodiment of the present disclosure mounted thereon.

FIG. 13A and FIG. 13B are views of examples of an automobile having the stereo camera device 800 mounted thereon. In both FIG. 13A and FIG. 13B, there are illustrated an automobile 1000, a windshield 1001, and an occupant seat 1002. As illustrated in FIG. 13A and FIG. 13B, the stereo camera device 800 is provided on the occupant seat 1002 side with respect to the windshield 1001 that is a windowpane, and is mounted specifically in the vicinity of an upper edge portion of the windshield 1001.

The stereo camera device 800 according to this embodiment can be suitably mounted on a windshield in an automobile in which an upper part of an occupant seat is opened as illustrated in FIG. 13B as well as an automobile in which an occupant seat is closed as illustrated in FIG. 13A.

In the case where automatic driving and driving support are sophisticated, when it is required to measure a distance between an automobile and another automobile running behind or to measure a distance between an automobile and an object at a time when the automobile moves backward, the stereo camera device 800 can be mounted also on an occupant seat side of the windowpane on a rear side. Even in this case, in the stereo camera device according to this embodiment, a decrease in accuracy of stereo measurement caused by direct sunlight, cold air, or the like is suppressed, and hence measurement results with high reliability can be obtained.

The embodiment of the present disclosure is not limited to the above-mentioned embodiment and may be appropriately modified or combined. For example, the number, shape, arrangement, and the like of the free curved surface mirrors forming each imaging optical system may be appropriately modified.

(Manufacturing Method)

Now, a method of manufacturing a stereo camera device according to a fourth embodiment of the present disclosure is described with reference to the drawings.

Figure 14:
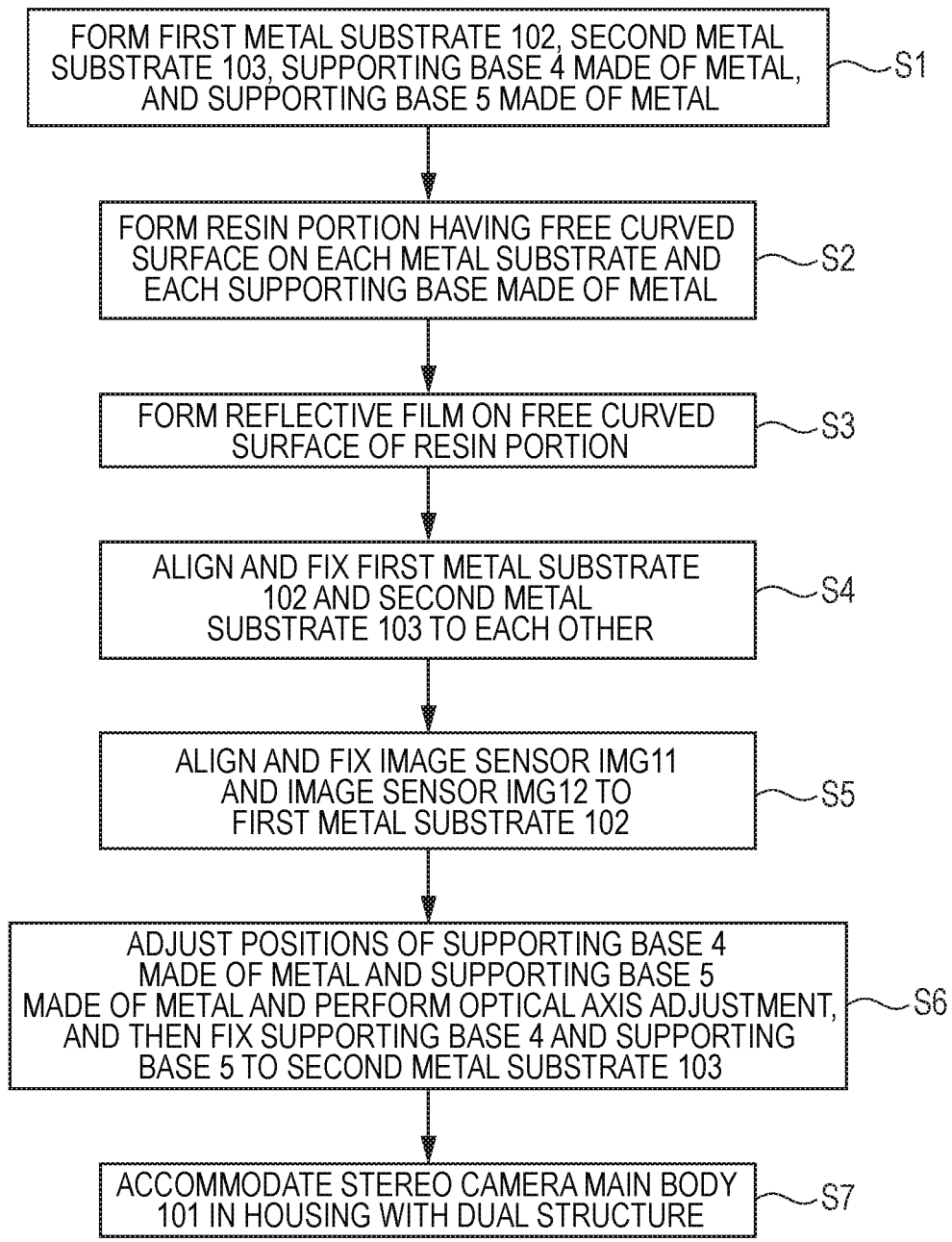
FIG. 14 is a flowchart for illustrating a manufacturing procedure in the embodiment of the present disclosure.

FIG. 14 is a flowchart for illustrating a manufacturing procedure of the stereo camera device.

First, in Step S1, the first metal substrate 102, the second metal substrate 103, the supporting base 4 made of a metal, and the supporting base 5 made of a metal, which form a skeleton portion of the stereo camera main body 101, are formed. As described above, it is difficult to form all the reflective surfaces of the two imaging optical systems on a single metal frame in consideration of methods of manufacturing the resin portion and the reflective film. Therefore, in this embodiment, the reflective surfaces are arranged on the two metal substrates and the two supporting bases. Specifically, as illustrated in FIG. 7, the first metal substrate 102 on which the reflective surfaces configured to reflect light at the even-numbered turns counted from an incidence side and the second metal substrate 103 on which the reflective surfaces configured to reflect light at the odd-numbered turns counted from the incidence side are arranged in separate frames.

The metal substrate and the supporting base made of a metal can be manufactured, for example, by press working, die casting, mold forming such as thixomolding, and cutting processing. A metal material to be used includes an alloy containing Mg as a main component. The alloy containing Mg as a main component has an advantage in that the alloy is lightweight and excellent in damping capacity, and a frame and a supporting base can be manufactured with light weight and high stiffness at low cost. Further, when a magnesium alloy is used, a lens barrel member made of a metal can be manufactured with higher accuracy by a thixomolding method. Therefore, there is an advantage from the viewpoint of enhancing accuracy (surface accuracy and position accuracy) of the reflective surface.

Figure 15:
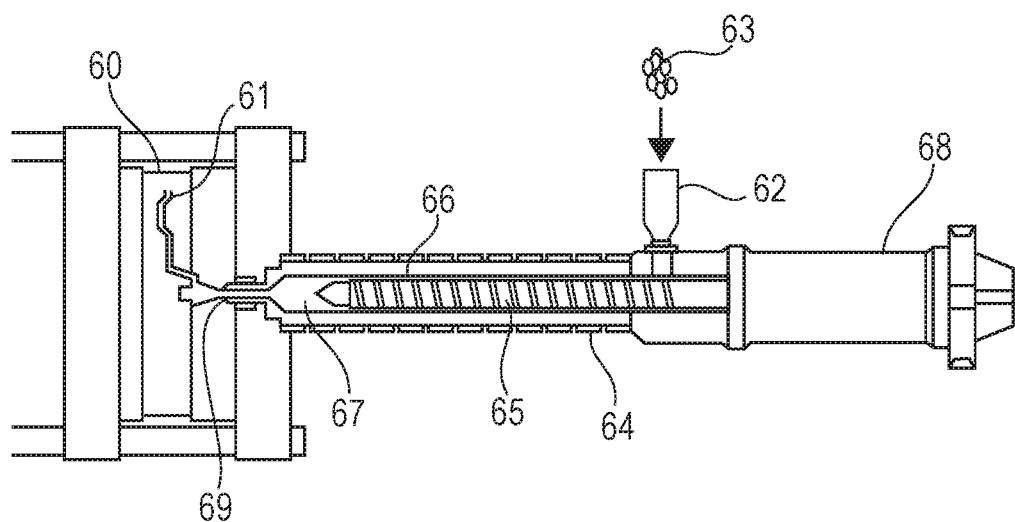
FIG. 15 is a schematic view for illustrating a method of manufacturing a metal substrate.

FIG. 15 is a view for illustrating an injection molding device configured to manufacture a metal substrate and a supporting base made of a metal. In FIG. 15, there are illustrated a die 60, a cavity 61, a raw material hopper 62, a magnesium alloy chip 63, a heater 64, a screw 65, a cylinder 66, a storage portion 67, a high-speed injection unit 68, and a nozzle 69.

For example, when the magnesium alloy chip 63 is loaded as a metal material into the raw material hopper 62, the metal material is heated to be liquefied by the heater 64 and pressed by the screw 65 to flow to the storage portion 67 through the cylinder 66. Then, the liquid metal at a temperature of from 560° C. to 630° C. stored in the storage portion 67 is injected from the nozzle 69 through action of the high-speed injection unit 68. The cavity 61 matched with the shape of a metal frame or a supporting base to be formed is formed in the die 60, and the molten metal injected from the nozzle 69 to the cavity 61 is cooled to be solidified and taken out from the cavity.

Returning to FIG. 14, in Step S2, the resin portion 122 (see FIG. 4B) serving as an underlayer of a reflective surface is formed on each metal substrate and each supporting base manufactured in Step S1.

As a method of forming a resin portion, a molding technology using a die, such as an insert molding method, a thermal pressure bonding method, or a replica molding method, can be utilized. With a die that satisfies the shape accuracy of the reflective surface being prepared in advance, when any manufacturing error is present in the metal substrate and the supporting base, the influence thereof is absorbed, and a reflective surface shape with high accuracy can be formed.

Figure 16A:
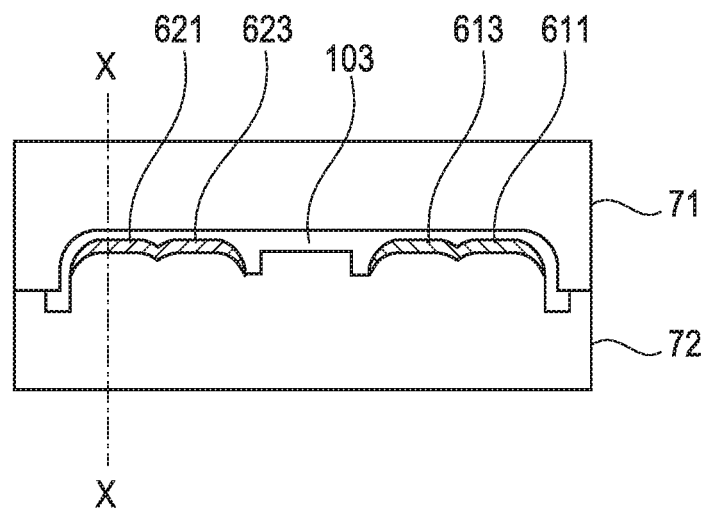
FIG. 16A is a schematic sectional view for illustrating a method of manufacturing a resin portion in the embodiment of the present disclosure.
Figure 16B:
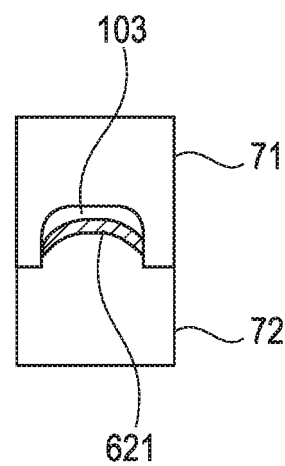
FIG. 16B is a schematic sectional view for illustrating the method of manufacturing a resin portion in the embodiment of the present disclosure.

FIG. 16A is a schematic sectional view for illustrating an example in which resin portions are formed on the second metal substrate 103 by an insert molding method, and FIG. 16B is a schematic sectional view of an insert die taken along the line X-X of FIG. 16A. In FIG. 16A and FIG. 16B, there are illustrated an upper die 71, a lower die 72, the second metal substrate 103, and resin portions 611, 613, 621, and 623 formed as underlayers of the reflective surface R11, the reflective surface R13, the reflective surface R21, and the reflective surface R23. The second metal substrate 103 is held between the upper die 71 and the lower die 72 and fixed so as to be brought into close contact with the upper die 71, and a cavity is formed between the second metal substrate 103 and the lower die 72. The inner surface of the lower die 72 is processed with high accuracy so that a free curved surface shape with high accuracy can be transferred to the resin portion serving as the underlayer of each reflective surface. In FIG. 16A, there is illustrated a state in which a resin is injected into each cavity in the die, and the resin portion 611, the resin portion 613, the resin portion 621, and the resin portion 623 are formed on the second metal substrate 103. When the resin injected into each cavity is cooled to be solidified, die opening is performed to separate the upper die 71 and the lower die 72 from each other. The second metal substrate 103 having the resin portions formed thereon is taken out from the dies. The reflective surface R11, the reflective surface R13, the reflective surface R21, and the reflective surface R23 are arranged on a surface on one side of the second metal substrate 103, and hence the resin portions can be formed easily by insert molding. Each resin portion of the first metal substrate 102, the supporting base 4 made of a metal, and the supporting base 5 made of a metal can be formed in the same manner.

There is no particular limitation on a material for the resin portion as long as the material can be molded through use of a die, and the material can be selected from a thermosetting resin, a thermoplastic resin, and a UV-curable resin in consideration of ease of molding, durability, and the like. For example, a polycarbonate resin, an acrylic resin, an MS resin, and a polyolefin-based resin can be used. In particular, the polyolefin-based resin has low hygroscopic property, and hence a change in shape of the reflective surface in association with moisture absorption of the resin can be suppressed. Thus, when the polyolefin-based resin is used, it is possible to provide a reflective optical unit that achieves high distance measurement accuracy without being influenced by a humidity environment in which the unit is used. As a specific example of the polyolefin-based material, for example, ZEONEX (trade name) manufactured by Zeon Corporation, and the like can be used. In addition, it is not required that the resin portion be formed of a single material. The material in which inorganic fine particles for enhancing characteristics as the material and imparting a function are dispersed may also be used. In addition, the resin portion may be formed of a plurality of layers of different materials.

The resin portions may be provided independently on the reflective surface basis or may be integrated as an underlayer common to a plurality of reflective surfaces.

Returning to FIG. 14, in Step S3, a reflective film is formed on each metal substrate and each supporting base having the resin portions formed thereon in Step S2. For formation of the reflective film, various film-forming methods can be used, and vapor deposition, a sputtering method, and the like, which are generally widely utilized, can be used. As a material for the reflective film, a metal having a high reflectance, such as aluminum and silver, may be used, and it is desired that a reflectance of 90% or more be ensured with respect to light in a wavelength region of from 400 nm to 800 nm. Further, a dielectric film or the like may be added to form a multilayer film in order to improve surface protection and a reflectance.

Figure 17:
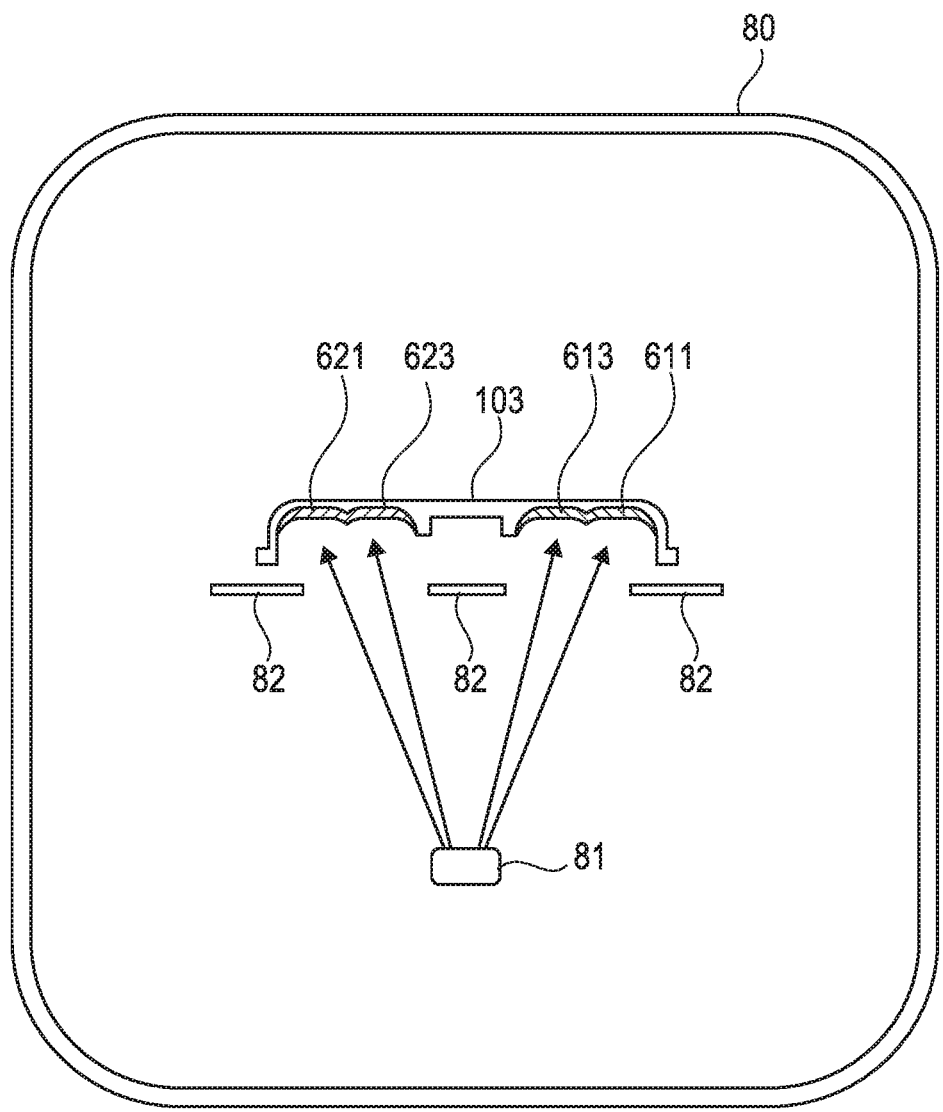
FIG. 17 is a schematic view for illustrating a method of manufacturing a reflective film in the embodiment of the present disclosure.

FIG. 17 is a schematic view for illustrating an example in which the reflective film 123 is formed on the resin portion 611, the resin portion 613, the resin portion 621, and the resin portion 623 of the second metal substrate 103 by a vacuum vapor deposition method, and there are illustrated a vacuum chamber 80 of a vacuum vapor deposition device, a vapor deposition source 81, and a vapor deposition mask 82. The second metal substrate 103 is set at a predetermined position in the vacuum chamber 80 reduced in pressure to a predetermined vacuum degree. The predetermined position is a position at which the resin portion 611, the resin portion 613, the resin portion 621, and the resin portion 623 are seen from the vapor deposition source 81. The vapor deposition mask 82 is arranged in the vacuum chamber 80 so that a reflective film material does not adhere to the surface of the second metal substrate 103 other than the resin portion 611, the resin portion 613, the resin portion 621, and the resin portion 623. The reflective film material evaporated from the vapor deposition source 81 is deposited on the free curved surfaces of the resin portion 611, the resin portion 613, the resin portion 621, and the resin portion 623 to form the reflective film 123. Due to the configuration in which the reflective surface R11, the reflective surface R13, the reflective surface R21, and the reflective surface R23 are arranged on a surface on one side of the second metal substrate 103, the reflective film on each reflective surface can be formed by a single vapor deposition process. Each reflective film of the first metal substrate 102, the supporting base 4 made of a metal, and the supporting base 5 made of a metal can be formed in the same manner.

A mass production property may be improved by enabling a plurality of metal substrates and supporting bases to be set in a vacuum vapor deposition device so that reflective films can be formed on a plurality of members with one vapor deposition. The same applies also to the case of using another film-forming technology such as a sputtering method.

Returning to FIG. 14, in Step S4, the first metal substrate 102 and the second metal substrate 103 each having the reflective film 123 formed thereon in Step S3 are aligned with and fixed to each other. As illustrated in FIG. 4A, FIG. 5, and FIG. 6, both ends of the first metal substrate 102 and the second metal substrate 103 are held through use of the fixing member 6 and the fixing member 7 to be united so that the reflective surfaces of the first metal substrate 102 and the second metal substrate 103 are opposed to each other to form two off-axial optical systems on the right and left sides. That is, the first metal substrate and the second metal substrate are aligned with each other so that the reflective surfaces of the first metal substrate and the reflective surfaces of the second metal substrate form a stereo imaging optical system formed of the first imaging optical system and the second imaging optical system. Then, the second metal substrate is fixed to the first metal substrate at a position closer to one end portion of the first metal substrate than to the opening SP1 and a position closer to another end portion of the first metal substrate than to the opening SP2.

In this embodiment, both the first metal substrate 102 and the second metal substrate 103 are fixed with a heat conductive member in each of both the end portions in Step S4 so that a large temperature difference does not occur between the metal substrates. That is, the first metal substrate 102 and the second metal substrate 103 are fixed to each other through use of the fixing member 6 and the fixing member 7 so that a plurality of heat conduction paths having satisfactory heat conduction are formed through direct contact between the metal substrates. In FIG. 4A, the first metal substrate 102 and the second metal substrate 103 are brought into abutment against each other in the abutment portion 8 and the abutment portion 9, and two heat conduction paths configured to satisfactorily conduct heat are formed. A method of forming a heat conduction path has various modes as described above. Depending on the mode, the step of forming a heat conduction path may be inserted into the step flow of FIG. 14 separately from Step S4 of aligning and fixing the metal substrates.

Returning to FIG. 14, in Step S5, image sensors are aligned with and fixed to the metal substrates united in Step S4. That is, the image sensor IMG11 and the image sensor IMG12 are fixed to predetermined positions of the first metal substrate 102 so that the image sensor IMG11 can be arranged at an imaging position of the first imaging optical system LO1 and the image sensor IMG12 can be arranged at an imaging position of the second imaging optical system LO2.

Figure 18:
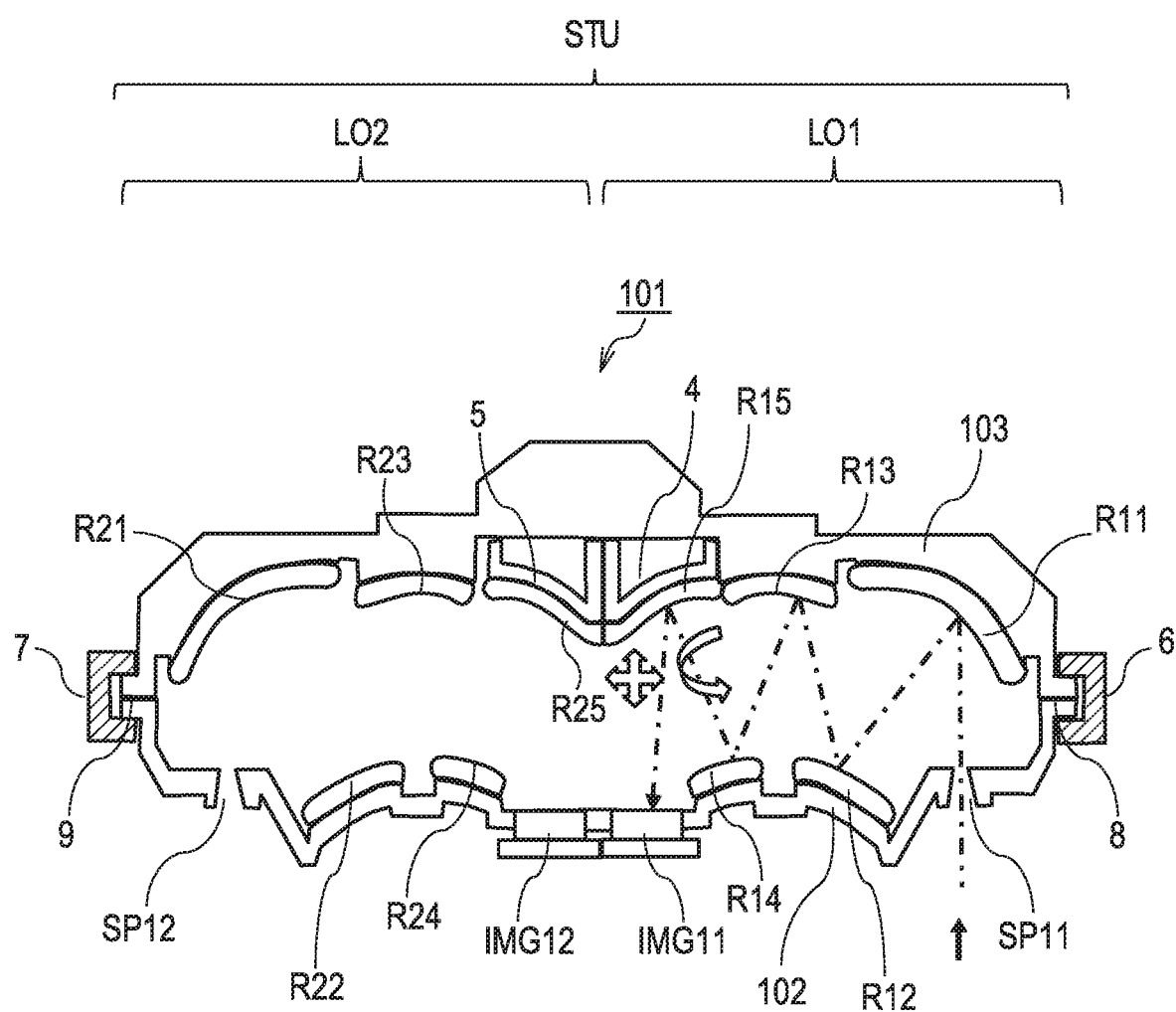
FIG. 18 is a schematic view for illustrating optical axis adjustment through use of a supporting base in the embodiment of the present disclosure.

Next, in Step S6, the supporting base 4 and the supporting base 5, each being made of a metal and having the reflective surface closest to the image sensor mounted thereon, are adjusted for position, and optical axis adjustment is performed. After that, the supporting base 4 and the supporting base 5 are fixed to the second metal substrate 103. In general, optical axis adjustment is performed individually in the first imaging optical system LO1 and the second imaging optical system LO2. FIG. 18 is a view for schematically illustrating a state in which the position and posture of the reflective surface R15 are adjusted in Step S6 so as to perform optical axis adjustment of the first imaging optical system LO1. In the first imaging optical system LO1, the relative positions between the opening SP11 serving as a first opening for taking in ambient light and the reflective surface R11, the reflective surface R12, the reflective surface R13, the reflective surface R14, and the image sensor IMG11 have been fixed. It is advantageous to perform optical axis adjustment through use of the reflective surface R15 closest to the image sensor in the first imaging optical system so as to easily perform optical axis adjustment. In view of the foregoing, as illustrated in FIG. 18, light is caused to enter from the opening SP11, and the imaging state in the image sensor IMG11 is observed while an optical image or a sensor output signal is watched. Then, the position and angle of the supporting base 4 made of a metal are adjusted through use of a jig (not shown). The supporting base 4 made of a metal adjusted for position and angle is fixed to the second metal substrate 103. In the same manner as the foregoing, also in the second imaging optical system LO2, the supporting base 5 made of a metal is adjusted for position and angle through use of a jig (not shown) to perform optical axis adjustment of the reflective surface R25. After that, the supporting base 5 is fixed to the second metal substrate 103. Through this step, the stereo camera main body 101 including the stereo imaging optical system STU is completed.

Returning to FIG. 14, in Step S7, the stereo camera main body 101 completed in Step S6 is accommodated in a housing. As illustrated in FIG. 10, the stereo camera main body 101 is supported so as to be held by the inner housing upper member 6031 and the inner housing lower member 6032, and supported so as to be held further by the outer housing upper member 6051 and the outer housing lower member 6052 from outside. Then, the attachment member 606 configured to mount the stereo camera device on a windshield of an automobile or the like is joined to an upper portion of the outer housing 605.

Thus, the stereo camera device having the stereo camera main body 101 mounted thereon is completed. According to the manufacturing method in this embodiment, it is possible to manufacture a stereo camera device at low cost, in which a decrease in accuracy of stereo measurement is suppressed even when the stereo camera device is locally heated or cooled, and which is small. The manufacturing method in this embodiment of the present disclosure is not limited to the above-mentioned example, and may be appropriately modified and combined.

Example 3

Next, a specific example is described.

The metal substrate 102, the metal substrate 103, the supporting base 4, and the supporting base 5 of the stereo camera main body 101 were molded by a thixomolding method of an Mg alloy (AZ91D). A total of ten (five surfaces×2) reflective surfaces forming two pairs of imaging optical systems for both right and left eyes are formed on the inner surfaces of the metal substrate 102, the metal substrate 103, the supporting base 4, and the supporting base 5. In each of the reflective surfaces, a layer of a polyolefin-based resin (ZEONEX E48R (trade name) manufactured by Zeon Corporation) having a thickness of about 1 mm was covered with a multilayer reflective film including an Al film as a main component.

The polyolefin-based resin is joined to the metal substrate and the supporting base by insert molding, and the multilayer reflective film is formed by vapor deposition. In each of the reflective surfaces, surface accuracy having an in-plane PV value of at least 2 μm or more is achieved.

The heat conduction path was formed by bringing the metal substrate 102 and the metal substrate 103 into abutment against each other, and in addition to this, the fixing tool made of a metal was also caused to function as the heat conduction path. A member having a heat conductivity of 20 [W/mK] or more and 100 [W/mK] or less was used for the metal substrate 102, the metal substrate 103, and the fixing tool made of a metal so as to sufficiently increase the heat conductance between the metal substrate 102 and the metal substrate 103.

Next, the following temperature measurement was performed through use of the housing of the stereo camera device. First, the housing with a dual structure including the inner housing 603 and the outer housing 605 was set in the vicinity of a windshield in an automobile exposed to direct sunlight in midsummer without the stereo camera main body 101 being accommodated in the housing. Then, the temperature of the housing was measured under a state in which an upper surface of the outer housing 605 was irradiated with direct sunlight, and a lower surface of the outer housing 605 was exposed to cold air from a cooling facility. As a result, the upper surface of the outer housing 605 was measured to be about 100° C., and the lower surface of the outer housing 605 was measured to be 25° C. The distribution (difference between the highest temperature and the lowest temperature) of the atmospheric temperature in the inner housing 603 fell within about 4° C.

Next, the stereo camera main body of the above-mentioned Example was accommodated in the above-mentioned housing with a dual structure, and distance measurement of an object, which was present 50 m forward of the housing, was performed. In this case, measurement was performed under two types of environments.

First, measurement was performed under a state in which there was substantially no temperature distribution outside the housing under an ordinary room temperature environment, and the distribution (hereinafter referred to as "ΔT") of the atmospheric temperature in the inner housing 603 was 0.5° C.

Second, as described above, measurement was performed under a state in which the housing was set in the vicinity of the windshield in the automobile which was exposed to direct sunlight in midsummer and in which a cooling facility was operated.

The results of distance measurement errors in the two types of measurements are shown in Table 1. The distance measurement error originally indicates how differently a distance was calculated from the result to be calculated to be 50 m. Specifically, an error when the distance was calculated to be 51 m is +2%.

An error in the case of ΔT=4° C. was about ±7% whereas an error in the case of ΔT=0.5° C. was ±5%. An increase in error was suppressed, and stable distance measurement was able to be performed.

TABLE 2

| | Distance measurement error (%) | |
|---|---|---|
| | ΔT = 0.5° C. | ΔT = 4° C. |
| Example 3 | About ±5% | About ±7% |

Comparative Example 2

Next, as Comparative Example 2, a stereo camera device in which a resin was used as a material for frames and a heat conduction path was not formed between the frames is described.

In this Comparative Example, the shapes and layout of the reflective surfaces of two pairs of imaging optical systems for both right and left eyes are the same as those in Example 3. However, unlike Example 3, ZEONEX E48R (trade name) manufactured by Zeon Corporation was used as materials for the frames and support members. That is, the frames and a resin forming an underlayer of each reflective surface were integrally molded by injection molding.

Then, the stereo camera main body was accommodated in the same housing with a dual structure as that in Example 3, and two types of distance measurements of an object, which was present 50 m forward of the housing, were performed in the same manner as in Example 3.

The results of distance measurement errors in the two types of measurements are shown in Table 3. The distance measurement error fell within the error equivalent to that of the Example in the case of ΔT=0.5° C., but the error was significantly increased under the environment of ΔT=4° C. The reason for this is considered as follows. The temperature distribution occurred between the frames, and the characteristics of the imaging optical systems were changed.

TABLE 3

| | Distance measurement error (%) | |
|---|---|---|
| | ΔT = 0.5° C. | ΔT = 4° C. |
| Comparative Example 1 | About ±5% | About ±30% |

As described above, as compared to the Comparative Example, in the Example, the distance measurement error was suppressed even under an environment in which an automobile was exposed to direct sunlight in midsummer and a cooling facility was operated in the automobile, and stable distance measurement was able to be performed.

According to the present disclosure, the reflective optical element that is lightweight and excellent in damping capacity can be provided.

With the reflective optical element according to the present disclosure, a reflective optical system that is lightweight and has a high damping capacity can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A reflective optical element comprising:
a metal substrate;
a resin layer on the metal substrate, the resin layer having an optical surface; and
a reflective film forming a mirror on the optical surface,
wherein the metal substrate comprises an alloy containing Mg as a main component,
wherein the resin layer comprises an olefin-based resin, and
wherein the resin layer is arranged between the metal substrate and the reflective film so as to be in contact with the metal substrate and the reflective film.

2. The reflective optical element according to claim 1, wherein the alloy containing Mg comprises a Mg—Li alloy.

3. The reflective optical element according to claim 1, wherein the resin layer has a thickness of 20 μm or more and 2,000 μm or less, and
wherein the metal substrate has a curved surface with which the resin layer is in contact.

4. The reflective optical element according to claim 1, wherein the olefin-based resin is a polyolefin-based resin.

5. A stereo camera device comprising:
a base portion including a metal portion and a resin portion;
a first imaging optical system;
a second imaging optical system; and
an image sensor,
wherein the base portion is provided with a first opening for taking in light to the first imaging optical system, with the first imaging optical system comprising a first plurality of mirrors that are configured to reflect the light taken in from the first opening,
wherein the base portion is provided with a second opening for taking in light to the second imaging optical system, with the second imaging optical system comprising a second plurality of mirrors that are configured to reflect the light taken in from the second opening,
wherein the first plurality of mirrors and the second plurality of mirrors are formed by a reflective optical element, wherein the reflective optical element comprises (a) a metal substrate, (b) a resin layer on the metal substrate, the resin layer having an optical surface, and (c) a reflective film forming a mirror on the optical surface,
wherein the metal substrate comprises an alloy containing Mg as a main component,
wherein the resin layer comprises an olefin-based resin,
wherein the metal portion includes the metal substrate, and
wherein the resin portion includes the resin layer.

6. The stereo camera device according to claim 5, wherein the metal portion includes a first metal substrate and a second metal substrate,
wherein the first metal substrate is provided with the first opening and the second opening,
wherein a first part of the first plurality of mirrors and a first part of the second plurality of mirrors are on the first metal substrate, and a second part of the first plurality of mirrors and a second part of the second plurality of the second plurality of mirrors are on the second metal substrate,
wherein the first part of the first plurality of mirrors on the first metal substrate and the second part of the first plurality of mirrors on the second metal substrate are disposed so as to be opposed to each other, and
wherein the second part of the second plurality of mirrors on the first metal substrate and the second part of the second plurality of mirrors on the second metal substrate are disposed so as to be opposed to each other.

7. The stereo camera device according to claim 5, wherein the first metal substrate and the second metal substrate are fixed to each other at a position closer to an end portion side of the first metal substrate than to the first opening and the second opening, and
wherein a thermally conductive member is provided at a portion in which the first metal substrate and the second metal substrate are brought into contact with each other.

8. The stereo camera device according to claim 7, wherein the thermally conductive member is provided in plurality and each of the thermally conductive members each include a grease containing a heat conductive material interposed between the first metal substrate and the second metal substrate.

9. The stereo camera device according to claim 7, wherein the thermally conductive member is provided in plurality and each of the thermally conductive members each include a sheet-shaped heat conductive material disposed between the first metal substrate and the second metal substrate.

10. The stereo camera device according to claim 7, wherein the thermally conductive member is provided in plurality and each of the thermally conductive members each include a heat conductive adhesive configured to fix the first metal substrate and the second metal substrate to each other.

11. The stereo camera device according to claim 7, wherein the thermally conductive member is provided in plurality and each of the thermally conductive members each include a metal jig configured to fix the first metal substrate and the second metal substrate to each other.

12. The stereo camera device according to claim 7, further comprising a heat conductive member bound to the first metal substrate and the second metal substrate at a position different from the position at which the first metal substrate and the second metal substrate are fixed to each other.

13. The stereo camera device according to claim 7, wherein the mirror comprises a free curved surface mirror including a resin portion that is disposed on the metal substrate, a free curved surface is formed on the resin portion, and a reflective film covers the free curved surface of the resin portion.

14. The stereo camera device according to claim 5, further comprising an inner housing and an outer housing,
wherein the base portion is supported so as to be separated from the inner housing, and the inner housing is supported so as to be separated from the outer housing.

15. An automobile comprising:
a windowpane; and
the stereo camera device according to claim 5 installed closer to a passenger seat than to the windowpane.

16. The stereo camera device according to claim 7, wherein the thermally conductive member is provided in plurality and disposed symmetrically along a direction in which the first imaging optical system and the second imaging optical system are arranged.

17. The stereo camera device according to claim 5, wherein the image sensor is fixed on the base portion.

18. The stereo camera device according to claim 6, wherein the image sensor is fixed on the first metal substrate.

19. The reflective optical element according to claim 1, wherein the reflective film is made of aluminum, silver, or chromium.

20. The reflective optical element according to claim 1, wherein the resin layer comprises a cyclic olefin-based resin.

21. A reflective optical element comprising:
a metal substrate;
a resin layer on the metal portion, the resin layer having an optical surface; and
a reflective film forming a mirror on the optical surface,
wherein the metal substrate includes a Mg—Li alloy,
wherein the resin layer comprises a thermoplastic resin, and
wherein the resin layer is arranged between the metal substrate and the reflective film so as to be in contact with the metal substrate and the reflective film.

22. The optical element according to claim 21, wherein the content of Li in the Mg—Li alloy is 5 mass % or more to 20 mass % or less.

23. The optical element according to claim 21, wherein the Mg—Li alloy further contains Al, and the content of Al in the Mg—Li alloy is 0.5 mass % or more to 15 mass % or less.

24. The optical element according to claim 22, wherein the Mg—Li alloy further contains Ca, and the content of Ca in the Mg—Li alloy is 5 mass % or less.

25. The optical element according to claim 21, wherein the resin layer is a surface-treated portion provided on the metal substrate.

26. The optical element according to claim 21, wherein the resin layer has a thickness of 20 μm or more to 2,000 μm or less, and
wherein the metal substrate has a surface with which the resin layer is in contact, the surface being rougher than the optical surface.

27. A stereo camera device comprising:
a base portion including a metal portion and a resin portion;
a first imaging optical system;
a second imaging optical system; and
an image sensor,
wherein the base portion is provided with a first opening for taking in light to the first imaging optical system, with the first imaging optical system comprising a first plurality of mirrors that are configured to reflect the light taken in from the first opening,
wherein the base portion is provided with a second opening for taking in light to the second imaging optical system, with the second imaging optical system comprising a second plurality of mirrors that are configured to reflect the light taken in from the second opening,
wherein the first plurality of mirrors and the second plurality of mirrors are formed by a reflective optical element,
wherein the reflective optical element comprises (a) a metal substrate, (b) a resin layer on the metal portion, the resin layer having an optical surface, and (c) a reflective film forming a mirror on the optical surface,
wherein the metal substrate includes a Mg—Li alloy,
wherein the metal portion includes the metal substrate, and
wherein the resin portion includes the resin layer.

28. The stereo camera device according to claim 27, wherein the image sensor is fixed on the base portion.

29. The stereo camera device according to claim 27, wherein the metal portion includes a first metal substrate and a second metal substrate,
wherein the first metal substrate is provided with the first opening and the second opening,
wherein a first part of the first plurality of mirrors and a first part of the second plurality of mirrors are on the first metal substrate, and a second part of the first plurality of mirrors and a second part of the second plurality of mirrors are on the second metal substrate,
wherein the first part of the first plurality of mirrors on the first metal substrate and the second part of the first plurality of mirrors on the second metal substrate are disposed so as to be opposed to each other, and
wherein the second part of the second plurality of mirrors on the first metal substrate and the second part of the second plurality of mirrors on the second metal substrate are disposed so as to be opposed to each other.

30. An automobile comprising:
a windowpane; and
the stereo camera device according to claim 27 installed closer to a passenger seat than to the windowpane.

* * * * *